US011871099B2

(12) United States Patent
Rho et al.

(10) Patent No.: US 11,871,099 B2
(45) Date of Patent: Jan. 9, 2024

(54) CAMERA MODULE AND ELECTRONIC DEVICE INCLUDING THE SAME

(71) Applicant: Samsung Electronics Co., Ltd., Suwon-si (KR)

(72) Inventors: Hyungjin Rho, Suwon-si (KR); Byungkwon Kang, Suwon-si (KR); Hyunho Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 17/430,181

(22) PCT Filed: Jul. 30, 2021

(86) PCT No.: PCT/KR2021/010006
§ 371 (c)(1),
(2) Date: Aug. 11, 2021

(87) PCT Pub. No.: WO2022/025719
PCT Pub. Date: Feb. 3, 2022

(65) Prior Publication Data
US 2022/0311916 A1      Sep. 29, 2022

(30) Foreign Application Priority Data

Jul. 31, 2020   (KR) .................. 10-2020-0096404

(51) Int. Cl.
*G03B 30/00*        (2021.01)
*H04N 23/55*        (2023.01)
(Continued)

(52) U.S. Cl.
CPC ............. *H04N 23/55* (2023.01); *H04N 23/54* (2023.01); *H04N 23/687* (2023.01)

(58) Field of Classification Search
USPC ....................................... 396/55; 348/208.99
See application file for complete search history.

(56) References Cited

U.S. PATENT DOCUMENTS 8,238,736 B2   8/2012  Tsuruta et al.
8,818,181 B1*  8/2014  Hwang .................. G01B 7/003
                                                324/207.2
(Continued)

FOREIGN PATENT DOCUMENTS

EP    10-1308621 B1   9/2013
EP       2919051 A2   9/2015
(Continued)

OTHER PUBLICATIONS

International Search Report dated Nov. 17, 2021, issued in International Patent Application No. PCT/KR2021/010006.
(Continued)

*Primary Examiner* — Clayton E. LaBalle
*Assistant Examiner* — Warren K Fenwick
(74) *Attorney, Agent, or Firm* — Jefferson IP Law, LLP

(57) ABSTRACT

An electronic device is provided. The electronic device includes a housing and a camera module, at least part of which is disposed inside the housing. The camera module includes a fixed part including a camera housing fixedly disposed in the electronic device, a moving part including a lens and an image sensor, at least part of the moving part being received inside the camera housing such that the moving part moves relative to the fixed part, a drive member that moves the moving part and that includes a first drive member disposed on the camera housing and a second drive member that is disposed on the moving part and that electromagnetically interacts with the first drive member, and a support structure that supports a movement of the moving part and that includes a ball coupled to one of the moving part or the camera housing so as to be rotatable.

15 Claims, 23 Drawing Sheets

(51) Int. Cl.
*H04N 23/54* (2023.01)
*H04N 23/68* (2023.01)

(56) References Cited

U.S. PATENT DOCUMENTS

| | | | |
|---|---|---|---|
| 9,025,947 B1 | 5/2015 | Teng | |
| 9,438,801 B2 * | 9/2016 | Hwang | G02B 27/646 |
| 9,527,161 B2 | 12/2016 | Watanabe et al. | |
| 9,544,482 B2 * | 1/2017 | Bang | G02B 7/08 |
| 9,804,408 B2 * | 10/2017 | Rho | G02B 13/001 |
| 9,832,383 B2 | 11/2017 | Hwang et al. | |
| 9,891,444 B2 | 2/2018 | Minamisawa | |
| 9,933,629 B2 | 4/2018 | Minamisawa | |
| 10,506,587 B2 | 12/2019 | Guo | |
| 10,527,866 B2 | 1/2020 | Chung et al. | |
| 10,747,013 B2 | 8/2020 | Lim | |
| 11,036,042 B2 | 6/2021 | Rho et al. | |
| 11,754,851 B2 | 9/2023 | Lim | |
| 2006/0092285 A1 * | 5/2006 | Shin | H04N 23/687 |
| | | | 348/208.7 |
| 2011/0091193 A1 * | 4/2011 | Lim | G02B 7/023 |
| | | | 396/133 |
| 2011/0103782 A1 | 5/2011 | Tsuruta et al. | |
| 2011/0164869 A1 * | 7/2011 | Kudoh | H04N 23/55 |
| | | | 396/349 |
| 2015/0049209 A1 | 2/2015 | Hwang et al. | |
| 2015/0336211 A1 | 11/2015 | Watanabe et al. | |
| 2016/0124242 A1 | 5/2016 | Minamisawa | |
| 2016/0170227 A1 | 6/2016 | Minamisawa | |
| 2017/0139225 A1 | 5/2017 | Lim | |
| 2018/0180900 A1 | 6/2018 | Chung et al. | |
| 2020/0077395 A1 | 3/2020 | Guo | |
| 2020/0132979 A1 * | 4/2020 | Rho | G02B 13/001 |
| 2023/0056716 A1 | 2/2023 | Lim | |

FOREIGN PATENT DOCUMENTS

| | | | |
|---|---|---|---|
| JP | 2011-257506 A | | 12/2011 |
| KR | 10-2010-0003515 A | | 1/2010 |
| KR | 20140144126 A | * | 12/2014 |
| KR | 10-2016-0013915 A | | 2/2016 |
| KR | 10-2018-0076790 A | | 7/2018 |
| KR | 10-2020-0003935 A | | 1/2020 |
| KR | 10-2020-0070704 A | | 6/2020 |
| KR | 10-2020-0088729 A | | 7/2020 |

OTHER PUBLICATIONS

European search report dated Nov. 23, 2023, issued in European Application No. 21850678.0.

* cited by examiner

CAMERA MODULE AND ELECTRONIC DEVICE INCLUDING THE SAME

TECHNICAL FIELD

This application is based on and claims priority under 35 U.S.C. § 119(a) of a Korean patent application number 10-2020-0096404, filed on Jul. 31, 2020, in the Korean Intellectual Property Office, the disclosure of which is incorporated by reference herein its entirety.

The disclosure relates to a camera module and an electronic device including the same.

BACKGROUND ART

An electronic device may include one or more camera modules. Each of the camera modules may provide an auto focus function by moving a lens assembly in an optical axis direction. At this time, the distance between a lens and an image sensor may be changed. The camera module may provide an image stabilization function by moving (e.g., rotating) the lens assembly. The image stabilization function may compensate for a shake of an image caused by external mechanical noise (e.g., vibration).

The above information is presented as background information only to assist with an understanding of the disclosure. No determination has been made, and no assertion is made, as to whether any of the above might be applicable as prior art with regard to the disclosure.

DISCLOSURE

Technical Problem

The camera module may rotate the lens to perform the image stabilization function. At this time, due to a change in the distance and angle between the lens and the image sensor, image quality may be deteriorated.

Aspects of the disclosure are to address at least the above-mentioned problems and/or disadvantages and to provide at least the advantages described below. Accordingly, an aspect of the disclosure is to provide a camera module for performing an image stabilization function by rotating a lens and an image sensor together and performing an auto focus function by changing the distance between the lens and the image sensor, and an electronic device including the camera module.

The technical problems to be solved by the disclosure are not limited to the aforementioned problems, and any other technical problems not mentioned herein will be clearly understood from the following description by those skilled in the art to which the disclosure pertains.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing and a camera module, at least part of which is disposed inside the housing. The camera module includes a fixed part including a camera housing fixedly disposed in the electronic device, a moving part including a lens and an image sensor, at least part of the moving part being received inside the camera housing such that the moving part moves relative to the fixed part, a drive member that moves the moving part and that includes a first drive member disposed on the camera housing and a second drive member that is disposed on the moving part and that electromagnetically interacts with the first drive member, and a support structure that supports a movement of the moving part and that includes a ball coupled to one of the moving part or the camera housing so as to be rotatable and disposed to make contact with the other. The moving part is configured such that a first distance from an optical axis of the lens to the ball is greater than a second distance from the optical axis of the lens to the second drive member.

In accordance with another aspect of the disclosure, an electronic device is provided. The electronic device includes a housing and a camera module, at least part of which is disposed inside the housing. The camera module includes a fixed part including a base and a sidewall structure disposed on the base, a moving part that is disposed to be at least partially surrounded by the sidewall structure and that includes a lens, an image sensor, and a circuit board that is electrically connected with the image sensor or on which the image sensor is disposed, the circuit board being disposed to at least partially face the base, a plurality of coils including a first coil disposed on a first sidewall of the sidewall structure, a second coil disposed on a second sidewall of the sidewall structure, and a third coil disposed on a third sidewall of the sidewall structure, and one or more balls disposed between the moving part and the sidewall structure. The electronic device further includes control circuitry electrically connected with the plurality of coils, and the control circuitry is configured to perform an image stabilization function by moving the moving part using at least one of the plurality of coils to vary a gap between the circuit board and the base.

In accordance with another aspect of the disclosure, a camera module is provided. The camera module includes a fixed part including a camera housing, a moving part including a lens and an image sensor, at least part of the moving part being received inside the camera housing such that the moving part moves relative to the fixed part, a drive member that moves the moving part and that includes a coil disposed on the camera housing and a magnet that is disposed on the moving part and that electromagnetically interacts with the coil, and a support structure that is disposed on the fixed part to support a movement of the moving part and that includes a ball coupled to one of the moving part or the camera housing so as to be rotatable and disposed to roll along a surface of the other. A third distance measured from an optical axis of the lens to the magnet in a direction perpendicular to the optical axis of the lens is smaller than a first distance measured from the optical axis of the lens to the ball in a direction perpendicular to the optical axis of the lens. The support structure is disposed on a first corner sidewall and a second corner sidewall that face each other in a direction of a first diagonal line passing through the lens and is disposed on a third corner sidewall and a fourth corner sidewall that face each other in a direction of a second diagonal line passing through the lens. The moving part is configured to rotate about axes parallel to the first diagonal line, the second diagonal line, and the optical axis of the lens.

Advantageous Effects

According to the embodiments of the disclosure, the camera module and the electronic device including the same may provide a rolling frictional force between the moving part including the lens and the image sensor and the fixed part in which the moving part is received. Accordingly, the moving part may be smoothly moved when an image stabilization function is performed.

In addition, the disclosure may provide various effects that are directly or indirectly recognized.

DESCRIPTION OF DRAWINGS

Throughout the drawings, like reference numerals will be understood to refer to like parts, components, and structures.

MODE FOR INVENTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
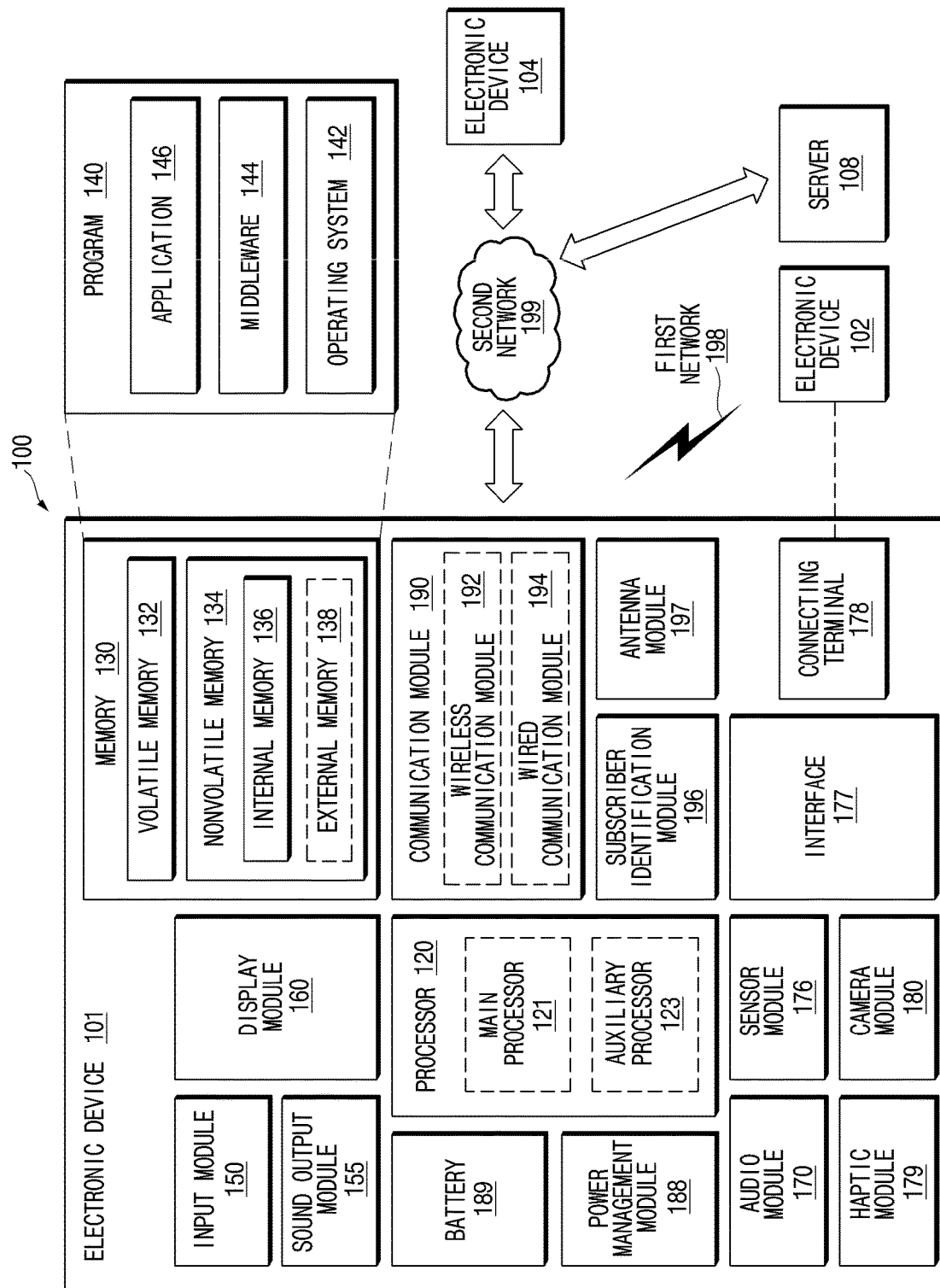
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
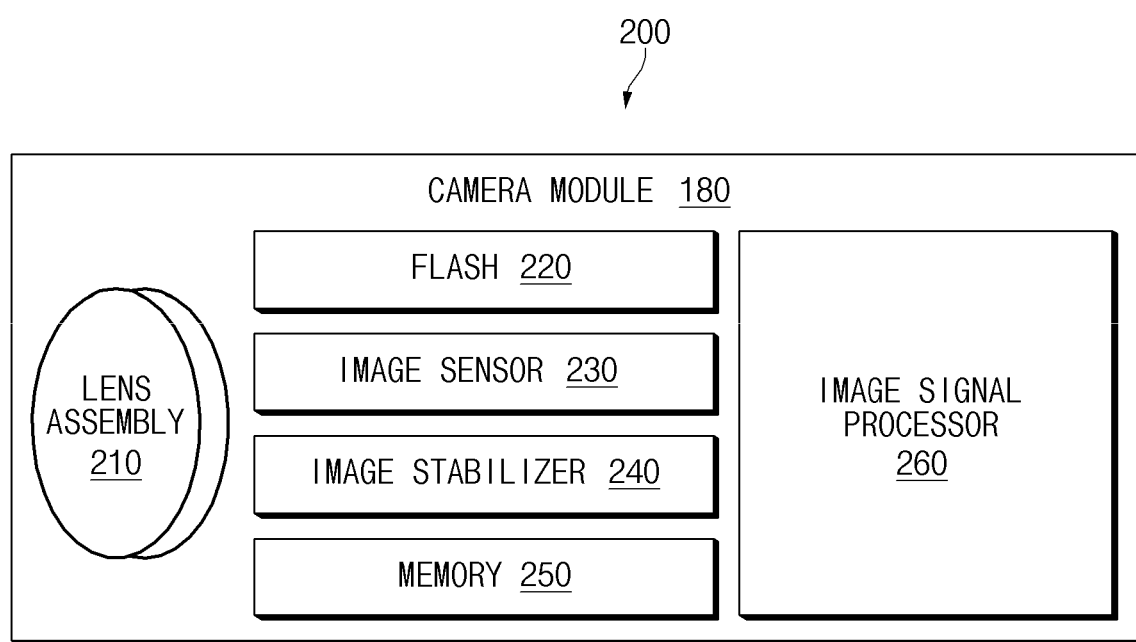
FIG. 2 is a block diagram illustrating a camera module according to an embodiment of the disclosure.

FIG. 2 is a block diagram illustrating a camera module according to an embodiment of the disclosure.

Referring to FIG. 2 depicting block diagram 200, a camera module 180 may include a lens assembly 210, a flash 220, an image sensor 230, an image stabilizer 240, memory 250 (e.g., buffer memory), or an image signal processor 260.

In an embodiment, at least one of the components included in the camera module 180 (e.g., the lens assembly 210, the flash 220, the image sensor 230, the image stabilizer 240, and the memory 250)) may be operated under the control of a control circuit (e.g., the processor 120 of FIG. 1) of the electronic device (e.g., the electronic device 101 of FIG. 1). For example, the control circuit (e.g., processor 120 in FIG. 1) may include a main processor (e.g., main processor 121 in FIG. 1) and/or a auxiliary processor (e.g., auxiliary processor 123 in FIG. 1) or image signal processor 260).

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180.

According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The plurality of camera modules 180 may include at least one of a wide-angle camera, a telephoto camera, and an IR (infrared) camera (e.g., a time of flight (TOF) camera, a structured light camera). According to an embodiment, the IR camera may be operated as at least a part of a sensor module (e.g., the sensor module 176 of FIG. 1). For example, the TOF camera may be operated as at least a part of a sensor module (e.g., the sensor module 176 of FIG. 1) for detecting the distance to the subject.

Figure 3A:
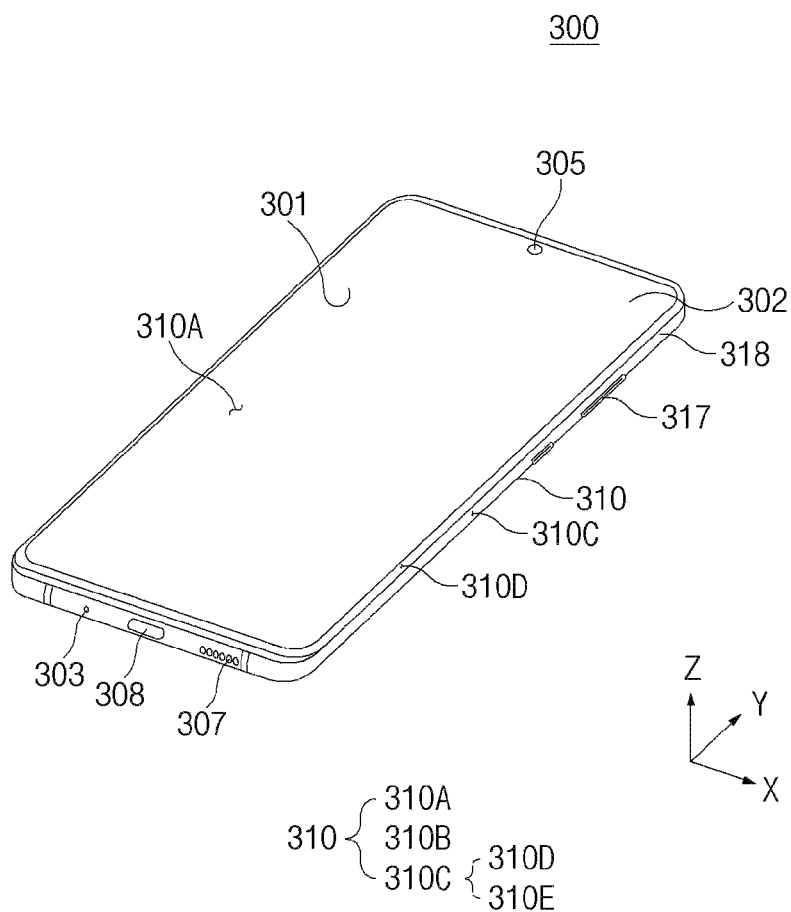
FIG. 3A is a front perspective view of an electronic device according to an embodiment of the disclosure.

FIG. 3A is a front perspective view of an electronic device according to an embodiment of the disclosure.

Figure 3B:
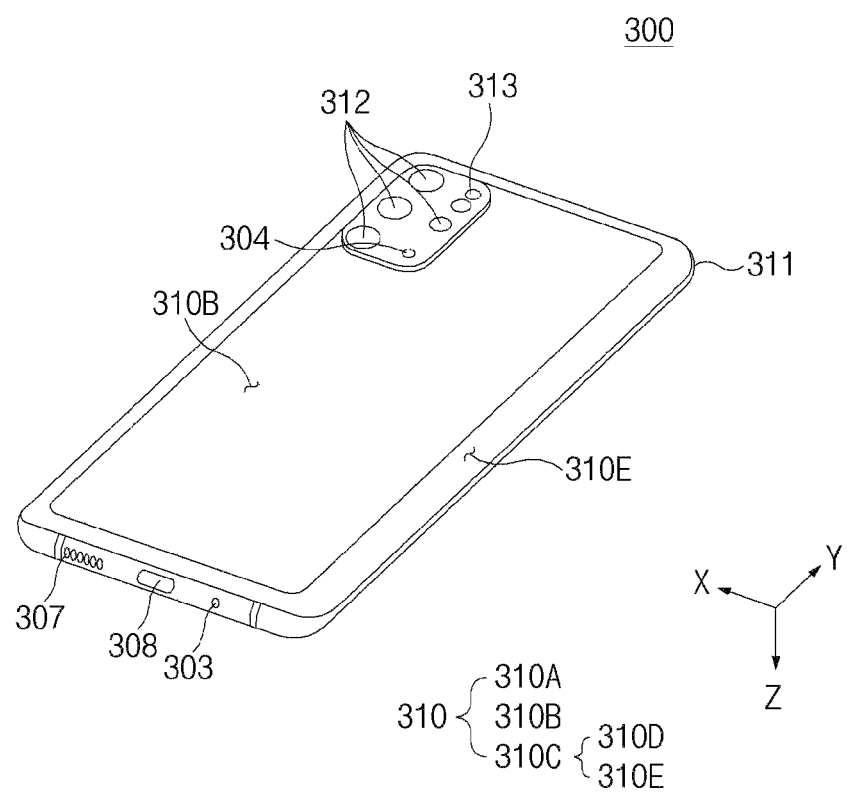
FIG. 3B is a rear perspective view of an electronic device according to an embodiment of the disclosure.

FIG. 3B is a rear perspective view of the electronic device according to an embodiment of the disclosure.

Figure 3C:
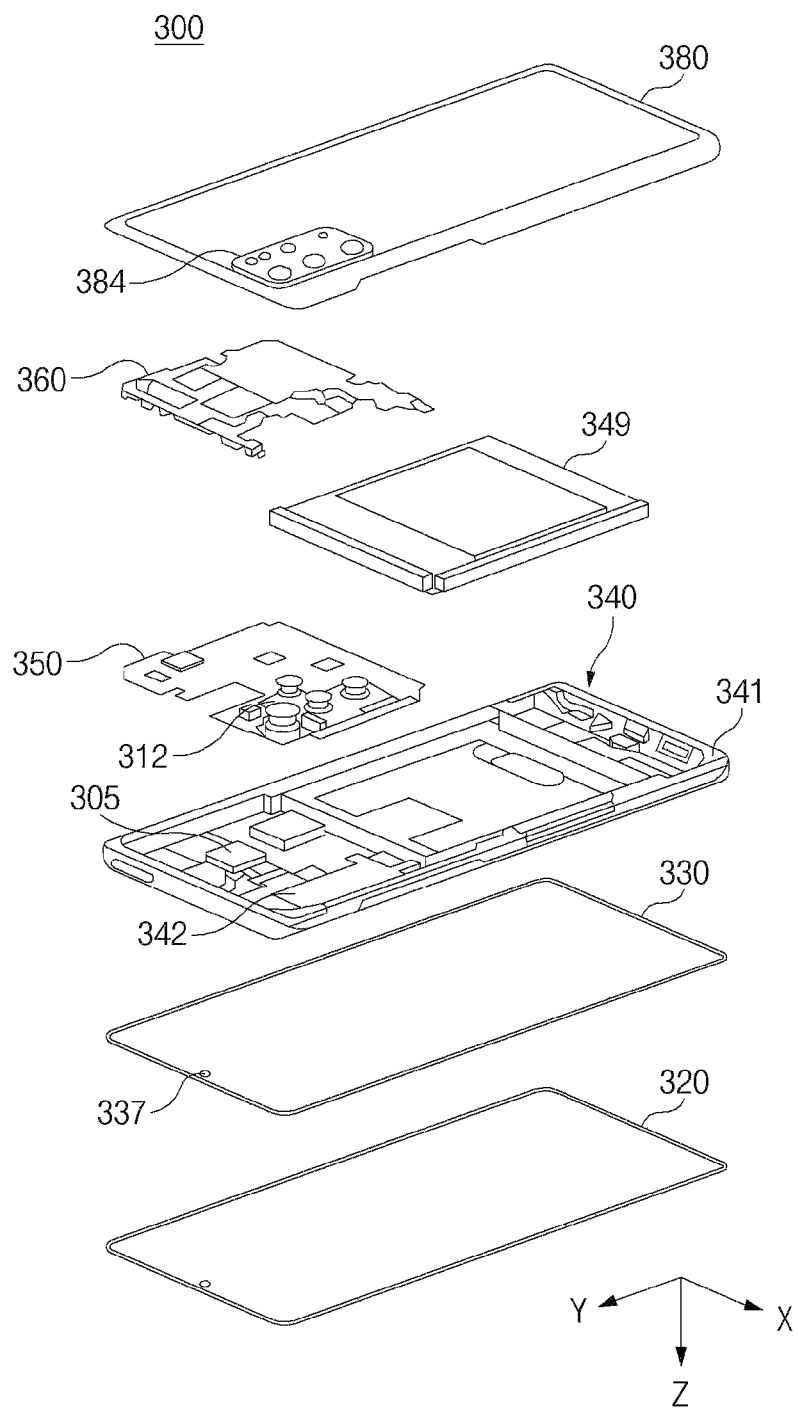
FIG. 3C is an exploded perspective view of an electronic device according to an embodiment of the disclosure.

FIG. 3C is an exploded perspective view of the electronic device according to an embodiment of the disclosure.

Referring to FIGS. 3A and 3B, an electronic device 300 may include a housing 310 that includes a first surface (or, a front surface) 310A, a second surface (or, a rear surface) 310B, and side surfaces 310C surrounding a space between the first surface 310A and the second surface 310B.

In another embodiment (not illustrated), the housing 310 may refer to a structure that forms some of the first surface 310A, the second surface 310B, and the side surfaces 310C of FIGS. 3A and 3B.

According to an embodiment, the first surface 310A may be formed by a front plate 302, at least part of which is substantially transparent (e.g., a glass plate including various coating layers, or a polymer plate). The second surface 310B may be formed by a back plate 311 that is substantially opaque. The back plate 311 may be formed of, for example, coated or colored glass, ceramic, polymer, metal (e.g., aluminum, stainless steel (STS), or magnesium), or a combination of at least two of the aforementioned materials. The side surfaces 310C may be formed by a side bezel structure (or, a "frame structure") 318 that is coupled with the front plate 302 and the back plate 311 and that contains metal and/or polymer.

In some embodiments, the back plate 311 and the side bezel structure 318 may be integrally formed with each other and may contain the same material (e.g., a metallic material such as aluminum).

In the illustrated embodiment, the front plate 302 may include, at opposite long edges thereof, two first areas 310D that curvedly and seamlessly extend from the first surface 310A toward the back plate 311.

In the illustrated embodiment, the back plate 311 may include, at opposite long edges thereof, two second areas 310E that curvedly and seamlessly extend from the second surface 310B toward the front plate 302.

In some embodiments, the front plate 302 (or, the back plate 311) may include only one of the first areas 310D (or, the second areas 310E). In another embodiment, the front plate 302 (or, the back plate 311) may not include a part of the first areas 310D (or, the second areas 310E).

In the embodiments, when viewed from a side of the electronic device 300, the side bezel structure 318 may have a first thickness (or, width) at sides (e.g., short sides) not including the first areas 310D or the second areas 310E and may have a second thickness (or, width) at sides (e.g., long sides) including the first areas 310D or the second areas 310E, the second thickness being smaller than the first thickness.

In an embodiment, the electronic device 300 may include at least one of a display 301 (e.g., the display module 160 of FIG. 1), an audio module 303, 304, 307 (e.g., the audio module 170 of FIG. 1), a sensor module (not illustrated) (e.g., the sensor module 176 of FIG. 1), camera modules 305 and 312 (e.g., the camera module 180 of FIG. 1), key input devices 317 (e.g., the input module 150 of FIG. 1), a light emitting element (not illustrated), or a connector hole 308 (e.g., the connecting terminal 178 of FIG. 1). In some embodiments, the electronic device 300 may not include at least one component (e.g., the key input devices 317) among the aforementioned components, or may additionally include other component(s).

In an embodiment, the display 301 may be exposed through most of the front plate 302. In some embodiments, at least part of the display 301 may be exposed through the front plate 302 that includes the first surface 310A and the first areas 310D of the side surfaces 310C.

In some embodiments, the periphery of the display 301 may be formed to be substantially the same as the shape of the adjacent outside edge of the front plate 302. In another embodiment (not illustrated), the gap between the periphery of the display 301 and the periphery of the front plate 302 may be substantially constant to expand the area by which the display 301 is exposed.

In an embodiment, a surface of the housing 310 (or, the front plate 302) may include a screen display area that is formed as the display 301 is visually exposed. For example, the screen display area may include the first surface 310A and the first areas 310D of the side surfaces 310C.

In some embodiments, the screen display area 310A and 310D may include a sensing area (not illustrated) that is configured to obtain biometric information of a user. Here, when the screen display area 310A and 310D includes the sensing area, this may mean that at least part of the sensing area overlaps the screen display area 310A and 310D. For example, the sensing area may refer to an area capable of displaying visual information by the display 301 like the other areas of the screen display area 310A and 310D and additionally obtaining the user's biometric information (e.g., fingerprint).

In an embodiment, the screen display area 310A and 310D of the display 301 may include an area through which the first camera module 305 (e.g., a punch hole camera) is visually exposed. For example, at least part of the periphery of the area through which the first camera module 305 is exposed may be surrounded by the screen display area 310A and 310D. In an embodiment, the first camera module 305 may include a plurality of camera modules (e.g., the camera module 180 of FIG. 1).

In another embodiment (not illustrated), the display 301 may include, on a rear surface of the screen display area 310A and 310D, at least one of the audio module 303, 304, and 307, the sensor module (not illustrated), a camera module (e.g., the first camera module 305), or the light emitting element (not illustrated). For example, the camera module (e.g., the first camera module 305) may be disposed on a rear side (e.g., a side facing the −Z-axis direction) of the first surface 310A (e.g., the front surface) and/or the side surfaces 310C (e.g., at least one surface of the first areas 310D) so as to face toward the first surface 310A and/or the side surfaces 310C. For example, the first camera module 305 may include an under display camera (UDC) that is hidden without being visually exposed on the screen display area. For example, the under display camera may be disposed such that an optical axis of a lens passes through a pixel array included in the display 301.

In some embodiments (not illustrated), the display 301 may be coupled with, or disposed adjacent to, touch detection circuitry, a pressure sensor for measuring the intensity (pressure) of a touch, and/or a digitizer for detecting a stylus pen of a magnetic type.

In an embodiment, the audio module 303, 304, and 307 may include the microphone holes 303 and 304 and the speaker hole 307.

In an embodiment, a microphone for obtaining an external sound may be disposed in the microphone hole 303. In some embodiments, the microphone may include a plurality of microphones to detect the direction of a sound. In some embodiments, the microphone hole 304 formed in a partial area of the second surface 310B may be disposed adjacent to the camera modules 305 and 312. For example, the microphone hole 304 may obtain a sound when the camera modules 305 and 312 are executed, or may obtain a sound when another function is executed.

In an embodiment, the speaker hole 307 may include an external speaker hole 307 and a receiver hole (not illustrated) for a telephone call. In some embodiments, the speaker hole 307 and the microphone hole 303 may be implemented as a single hole.

In an embodiment, the electronic device 300 may include a speaker fluidly connected with the speaker hole 307. In some embodiments, the speaker may include a piezoelectric speaker from which the speaker hole 307 is omitted.

In an embodiment, the sensor module (not illustrated) (e.g., the sensor module 176 of FIG. 1) may generate an electrical signal or a data value that corresponds to an operational state inside the electronic device 300 or an environmental state external to the electronic device 300. In an embodiment, the sensor module (not illustrated) may be disposed on the first surface 310A and/or the second surface 310B of the housing 310. For example, the sensor module may include at least one of a proximity sensor, an heart-rate monitor (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor. In some embodiments, at least part of the sensor module (not illustrated) may be disposed on the side surfaces 310C of the housing 310 (e.g., the first areas 310D and/or the second areas 310E).

In an embodiment, the camera modules 305 and 312 may include the first camera module 305 (e.g., a punch hole camera) exposed on the first surface 310A of the electronic device 300, the second camera module 312 exposed on the second surface 310B of the electronic device 300, and/or a flash 313.

In an embodiment, the first camera module 305 may be exposed through part of the screen display area 310A and 310D of the display 301. For example, the first camera module 305 may be exposed on a partial area of the screen display area 310A and 310D through an opening (not illustrated) that is formed in part of the display 301.

In an embodiment, the second camera module 312 may include a plurality of camera modules (e.g., a dual camera or a triple camera). However, the second camera module 312 is not necessarily limited to including the plurality of camera modules and may include one camera module.

The first camera module 305 and the second camera module 312 may include one or more lenses, an image sensor, and/or an image signal processor. The flash 313 may include, for example, a light emitting diode or a xenon lamp. In some embodiments, two or more lenses (an IR camera lens, a wide angle lens, and a telephoto lens) and image sensors may be disposed on one surface of the electronic device 300.

In an embodiment, the key input devices 317 may be disposed on the side surfaces 310C of the housing 310 (e.g., the first areas 310D and/or the second areas 310E). In some embodiments, the electronic device 300 may not include all or some of the aforementioned key input devices 317, and the key input devices 317 not included may be implemented in a different form, such as a soft key, on the display 301. In some embodiments, the key input devices 317 may include a sensor module (not illustrated) that forms the sensing area (not illustrated) that is included in the screen display area 310A and 310D.

In an embodiment, a connector may be received in the connector hole 308. In an embodiment, the connector hole 308 may be disposed in one of the side surfaces 310C of the housing 310. In some embodiments, the electronic device 300 may include the first connector hole 308 in which to receive a connector (e.g., a USB connector) for transmitting and receiving power and/or data with an external electronic device, and/or a second connector hole (not illustrated) in which to receive a connector (e.g., an earphone jack) for transmitting and receiving audio signals with an external electronic device.

In an embodiment, the electronic device 300 may include the light emitting element (not illustrated). For example, the light emitting element may be disposed on the first surface 310A of the housing 310. The light emitting element may provide state information of the electronic device 300 in the form of light. In some embodiments, the light emitting element may provide a light source operating in conjunction with the first camera module 305. For example, the light emitting element may include an LED, an IR LED, and/or a xenon lamp.

Referring to FIG. 3C, an electronic device 300 may include a front plate 320 (e.g., a first surface 310A and first areas 310D of FIG. 3A), a display 330 (e.g., the display 301 of FIG. 3A), a bracket 340, a battery 349, a printed circuit board 350 (e.g., a printed circuit board (PCB), a flexible PCB (FPCB), or a rigid-flexible PCB (RFPCB)), a support member 360 (e.g., a rear case), and a back plate 380 (e.g., a second surface 310B and second areas 310E of FIG. 3B).

In some embodiments, the electronic device 300 may not include at least one component (e.g., the support member 360) among the aforementioned components, or may additionally include other component(s). At least one of the components of the electronic device 300 may be the same as, or similar to, at least one of the components of the electronic device 300 of FIGS. 3A and 3B, and repetitive descriptions will hereinafter be omitted.

In an embodiment, the front plate 320, the back plate 380, and at least part of the bracket 340 (e.g., a frame structure 341) may form a housing (e.g., the housing 310 of FIGS. 3A and 3B).

In an embodiment, the bracket 340 may include the frame structure 341 that forms a surface of the electronic device 300 (e.g., a part of the side surfaces 310C of FIGS. 3A and 3B) and a plate structure 342 extending from the frame structure 341 toward the inside of the electronic device 300.

In an embodiment, the plate structure 342 may be located inside the electronic device 300 and may be connected with the frame structure 341, or may be integrally formed with the frame structure 341. The plate structure 342 may be formed of, for example, a metallic material and/or a non-metallic (e.g., polymer) material. The display 330 may be coupled to one surface of the plate structure 342, and the printed circuit board 350 may be coupled to an opposite surface of the plate structure 342. The printed circuit board 350 may have a processor, memory, and/or an interface mounted thereon. The processor may include, for example, one or more of a central processing unit, an application processor, a graphic processing unit, an image signal processor, a sensor hub processor, or a communication processor.

In an embodiment, the memory may include, for example, volatile memory or nonvolatile memory.

In an embodiment, the interface may include, for example, a high definition multimedia interface (HDMI), a universal serial bus (USB) interface, an SD card interface, and/or an audio interface. The interface, for example, may electrically or physically connect the electronic device 300 with an external electronic device and may include a USB connector, an SD card/MMC connector, or an audio connector.

In an embodiment, the battery 349 may supply power to at least one of the components of the electronic device 300. For example, the battery 349 may include a primary cell that is not rechargeable, a secondary cell that is rechargeable, or a fuel cell. In an embodiment, at least part of the battery 349 may be disposed on substantially the same plane as the printed circuit board 350. In an embodiment, the battery 349 may be integrally disposed inside the electronic device 300, or may be disposed so as to be detachable from the electronic device 300.

In an embodiment, the first camera module 305 may be disposed on the plate structure 342 of the bracket 340 such that a lens is visually exposed through a partial area of the front plate 320 (e.g., the first surface 310A of FIG. 3A) of the electronic device 300.

In an embodiment, the first camera module 305 may be disposed such that an optical axis of the lens is at least partially aligned with a hole or recess 337 formed in the display 330. For example, the area through which the lens is exposed may be formed in the front plate 320. For example, the first camera module 305 may include a punch hole camera, at least part of which is disposed in the hole or recess 337 formed in a rear surface of the display 330.

In an embodiment, the second camera module 312 may be disposed on the printed circuit board 350 such that a lens is exposed through a camera area 384 of the back plate 380 (e.g., the second surface 310B of FIG. 3B) of the electronic device 300. In another embodiment, the second camera module 312 may be disposed in at least part of an inner space formed in the housing 310 of the electronic device 300 (e.g., a space formed by the plate structure 342) and may be electrically connected to the printed circuit board 350 through a connection member (e.g., a connector (e.g., a connector 436 of FIG. 4)).

In an embodiment, the camera area 384 may be formed on a surface of the back plate 380 (e.g., the second surface 310B of FIG. 3B). In an embodiment, the camera area 384 may be formed to be at least partially transparent such that external light is incident on the lens of the second camera module 312. In an embodiment, at least part of the camera area 384 may protrude to a predetermined height from the surface of the back plate 380. However, without being necessarily limited thereto, the camera area 384 may form substantially the same plane as the surface of the back plate 380.

Figure 4:
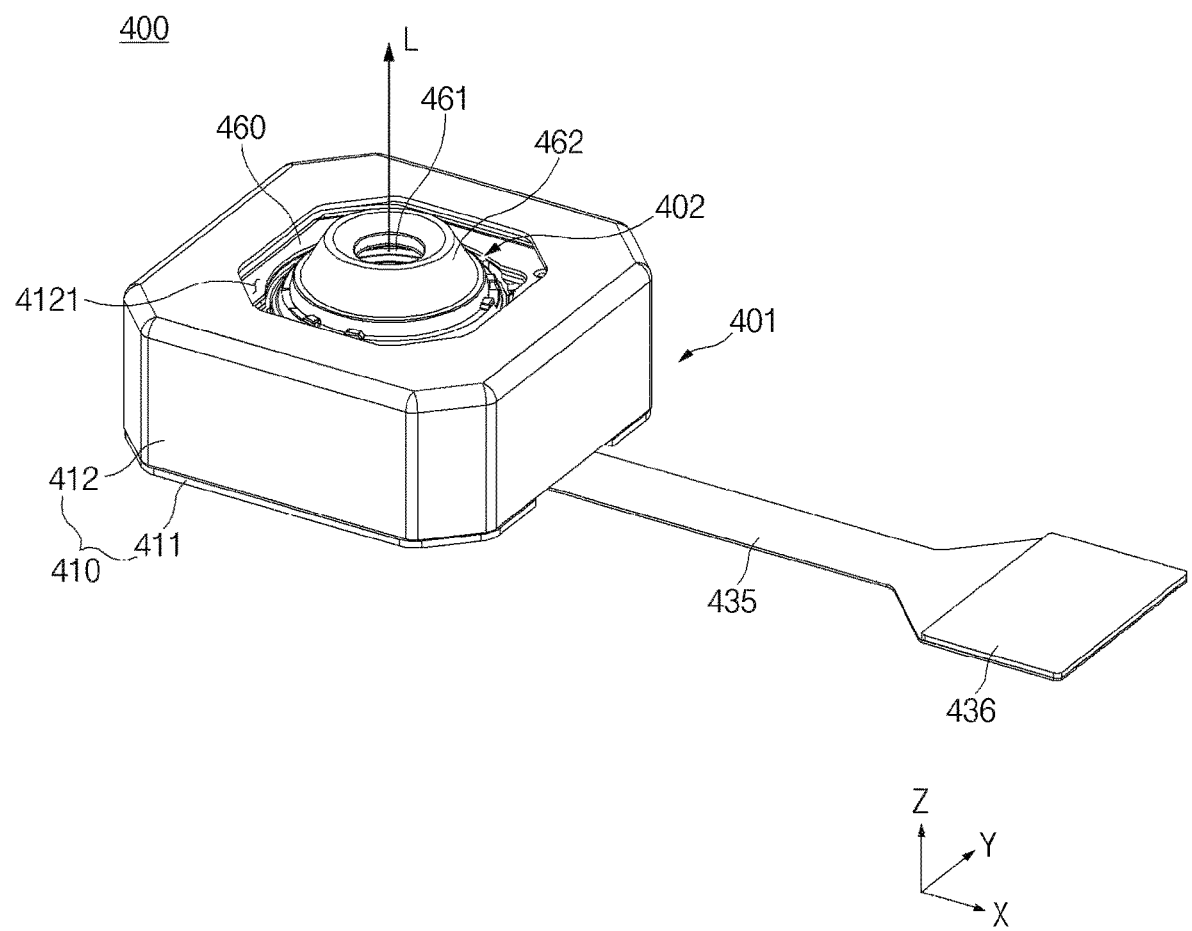
FIG. 4 is a perspective view of a camera module according to an embodiment of the disclosure.

FIG. 4 is a perspective view of a camera module according to an embodiment of the disclosure.

Referring to FIG. 4, a camera module 400 (e.g., a camera module 180 of FIGS. 1 and 2 or a camera module 305 or 312 of FIGS. 3A to 3C) may include a fixed part 401 fixed to the inside of an electronic device (e.g., an electronic device 300 of FIGS. 3A to 3C) and a moving part 402 configured to be movable relative to the fixed part 401. For example, at least part of the moving part 402 may be disposed inside the fixed part 401 and may be configured to be movable relative to the fixed part 401.

In an embodiment, the fixed part 401 may include a camera housing 410 in which at least part of the moving part 402 is received and a first connecting member 435 that is connected with electrical components (e.g., coils) in the camera housing 410 and that extends outside the camera housing 410. For example, the first connecting member 435 may electrically connect a printed circuit board (e.g., the printed circuit board 350 of FIG. 3C) of the electronic device (e.g., the electronic device 300 of FIGS. 3A to 3C) and the electrical components contained in the camera housing 410.

For example, the first connecting member 435 may include the connector 436 coupled to the printed circuit board 350 of the electronic device 300.

In an embodiment, the camera housing 410 may include a base 411 and a cover 412 coupled to the base 411. The base 411, together with the cover 412, may form an inner space of the camera housing 410 in which the moving part 402 is received. For example, the base 411 may form a lower surface (e.g., a flat surface facing the −Z-axis direction) of the camera module 400, and the cover 412 may form an upper surface (e.g., a flat surface facing the +Z-axis direction) of the camera module 400 and side surfaces surrounding the upper surface and the lower surface. The cover 412 may have an opening 4121 formed therein through which at least part of a lens 461 is exposed.

In an embodiment, at least part of the moving part 402 may be received in the camera housing 410. The moving part 402 may be configured to move inside the camera housing 410. In an embodiment, the moving part 402 may include a camera assembly 460. In an embodiment, the camera assembly 460 may include at least one lens 461, a lens barrel 462 surrounding the at least one lens 461, and an image sensor (e.g., the image sensor 230 of FIG. 2). In an embodiment, the camera assembly 460 may be disposed such that at least part of the lens 461 is exposed through the opening 4121 formed in the cover 412 of the camera housing 410. For example, at least part of the lens 461 may be visible through the opening 4121. In an embodiment, the moving part 402 may be configured such that the lens 461 receives light external to the electronic device through a partial area (e.g., the camera area 384 of FIG. 3C) of a surface (e.g., the back plate 380 of FIG. 3C) of a housing of the electronic device (e.g., the electronic device 300 of FIGS. 3A to 3C). For example, the area through which the lens 461 is exposed may include a transparent area of the housing (e.g., the housing 310 of FIGS. 3A and 3B) of the electronic device. In an embodiment, the image sensor may be disposed to be aligned with an optical axis L of the lens 461. For example, the image sensor (e.g., an image sensor 463 of FIGS. 5A and 5B) may convert an optical signal received through the lens 461 into an electrical signal.

In some embodiments, the camera assembly 460 may include a lens assembly (e.g., the lens assembly 210 of FIG. 2) that includes the at least one lens 461 and the lens barrel 462.

Figure 5A:
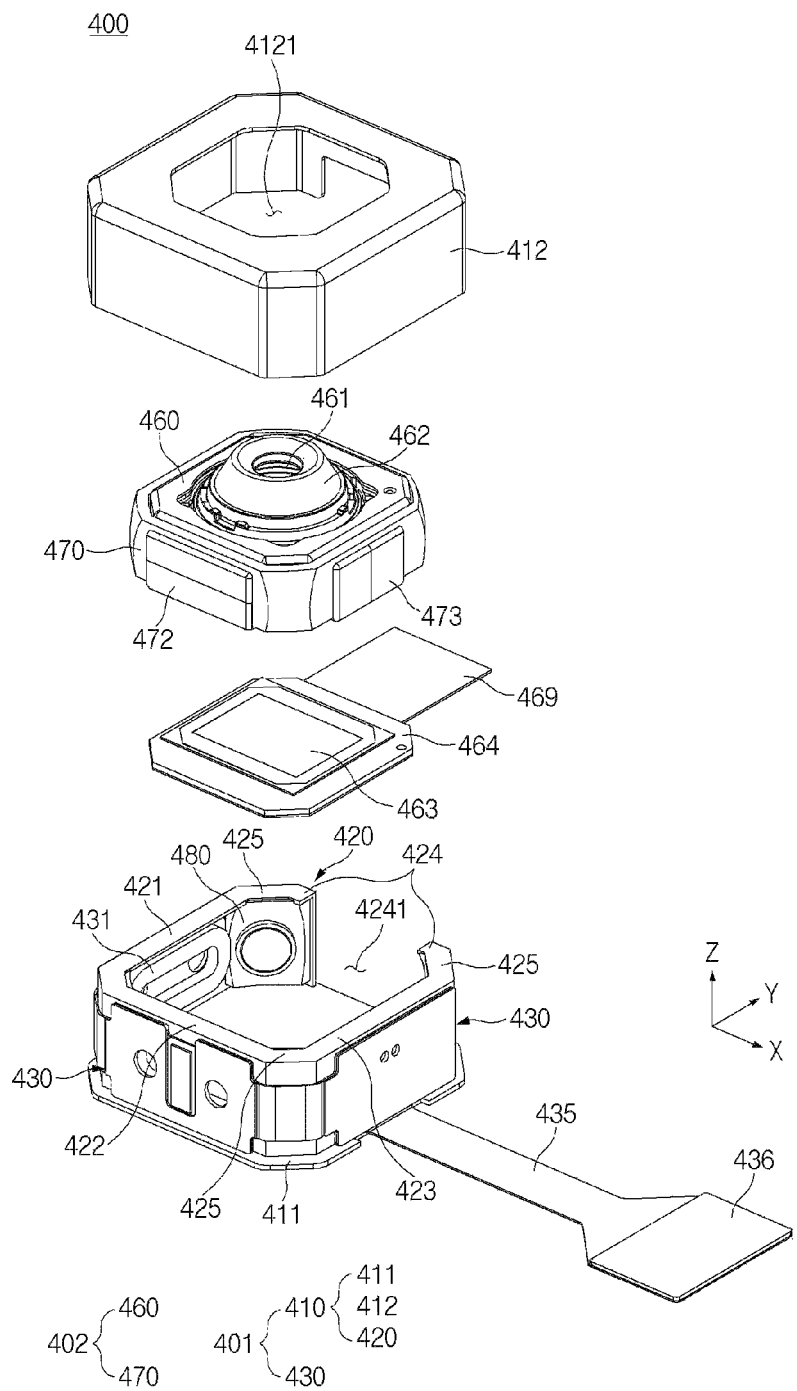
FIG. 5A is an exploded perspective view of a camera module according to an embodiment of the disclosure.

FIG. 5A is an exploded perspective view of a camera module according to an embodiment of the disclosure.

Figure 5B:
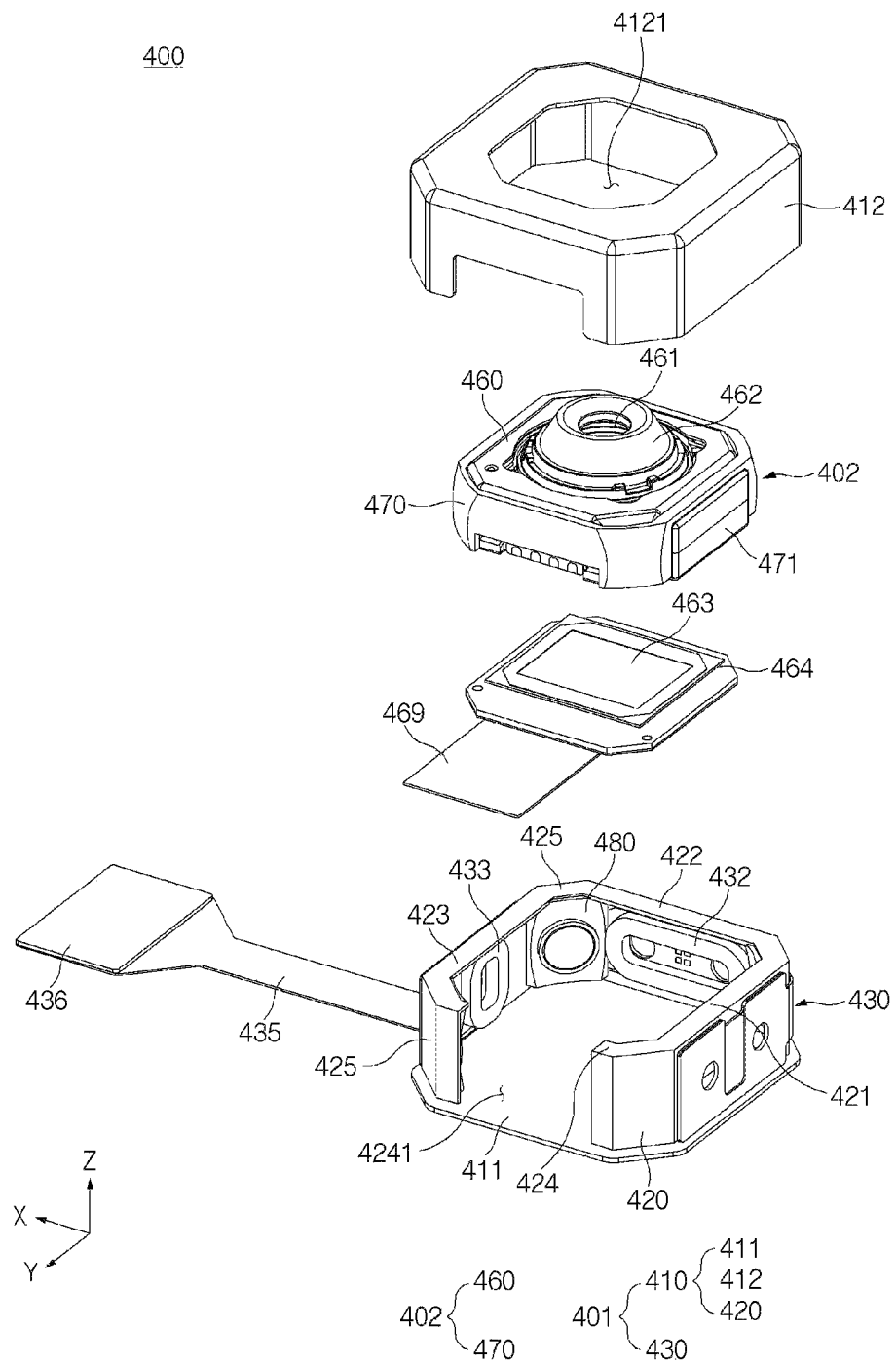
FIG. 5B is an exploded perspective view of a camera module according to an embodiment of the disclosure.

FIG. 5B is an exploded perspective view of a camera module according to an embodiment of the disclosure.

Referring to FIGS. 5A and 5B, a camera module 400 may include a moving part 402 and a fixed part 401. In an embodiment, the camera module 400 may perform an image stabilization function (e.g., optical image stabilization (OIS)) by moving the moving part 402 relative to the fixed part 401. For example, the moving part 402 may rotate about an axis of rotation substantially perpendicular or parallel to the optical axis L (e.g., an axis on an x-y plane intersecting with the optical axis L).

In an embodiment, the fixed part 401 may include the camera housing 410, a flexible circuit board 430 (e.g., an FPCB), the first connecting member 435, and coils 431, 432, and 433.

In an embodiment, the camera housing 410 may include the cover 412, the base 411, and a sidewall structure 420. The cover 412 and the base 411 may form a space in which the camera assembly 460 is disposed. For example, the cover 412 may have the opening 4121 formed therein through which at least part of the lens 461 is exposed. In an embodiment, the sidewall structure 420 may be formed to surround a partial area of the base 411. For example, the sidewall structure 420 may be formed in a shape that is open at one side. A second connecting member 469 of the moving part 402 may extend outside the camera module 400 in the direction in which the sidewall structure 420 is open. In an embodiment, the first coil 431, the second coil 432, and the third coil 433 may be disposed on the sidewall structure 420. In an embodiment, the sidewall structure 420 may be surrounded by the flexible circuit board 430.

In some embodiments, the base 411 of the camera housing 410 may include a base circuit board (not illustrated) that is connected with the flexible circuit board 430 and connected with the first connecting member 435 at one side of the base circuit board. In an embodiment, the base circuit board may face a circuit board 464 of the camera assembly 460. For example, the base circuit board may be spaced apart from the circuit board 464 of the camera assembly 460 by a specified gap (e.g., a predetermined gap G in FIGS. 11A and 11B), and the specified gap may be a gap (space) that does not affect a movement (e.g., rotation) of the moving part (e.g., sidewall structure 420). For example, the gap (e.g., the predetermined gap G in FIGS. 11A and 11B) may be formed to be a gap sufficient to include a maximum range of rotation of the moving part 402. In an embodiment, the sidewall structure 420 may include sidewalls 421, 422, 423, and 424 that face side surfaces of the moving part 402. For example, the sidewalls 421, 422, 423, and 424 may include the first sidewall 421 on which the first coil 431 is disposed, the second sidewall 422 on which the second coil 432 is disposed, the third sidewall 423 on which the third coil 433 is disposed, and the fourth sidewall 424 including an open area 4241 through which the second connecting member 469 extends.

In the illustrated embodiment, the first sidewall 421 may face the −X-axis direction, the second sidewall 422 may face the −Y-axis direction, the third sidewall 423 may face the X-axis direction, and the fourth sidewall 424 may face the Y-axis direction. For example, the first sidewall 421 may face the third sidewall 423, and the second sidewall 422 may face the fourth sidewall 424.

In an embodiment, the sidewall structure 420 may include corner sidewalls 425 formed between the adjacent sidewalls 421, 422, 423, and 424 facing directions perpendicular to each other.

In an embodiment, the flexible circuit board 430 may include the first coil 431, the second coil 432, and the third coil 433. In an embodiment, the flexible circuit board 430 may surround at least part of the sidewall structure 420 such that the first coil 431 is disposed on the first sidewall 421 of the sidewall structure 420, the second coil 432 is disposed on the second sidewall 422 of the sidewall structure 420, and the third coil 433 is disposed on the third sidewall 423 of the sidewall structure 420.

In an embodiment, the first coil 431 may face a first magnet 471, the second coil 432 may face a second magnet 472, and the third coil 433 may face a third magnet 473. In an embodiment, the coils 431, 432, and 433 and the magnets 471, 472, and 473 facing the coils 431, 432, and 433 may be configured to electromagnetically interact with each other.

In an embodiment, the flexible circuit board 430 may be electrically connected with the first connecting member 435. For example, the first coil 431, the second coil 432, and the third coil 433 may be electrically connected with the printed circuit board (e.g., the printed circuit board 350 of FIG. 3C) of the electronic device (e.g., the electronic device 300 of FIGS. 3A to 3C) through the first connecting member 435. In an embodiment, the flexible circuit board 430 may be formed to be at least partially flexible.

In an embodiment, the fixed part 401 may include support structures 480 disposed on the corner sidewalls 425. For example, the support structures 480 may be configured to at least partially face corner areas (e.g., corner areas 455 of FIG. 6) of the moving part 402. In an embodiment, the support structures 480 may be configured to support a movement (e.g., rotation) of the camera assembly 460.

In an embodiment, the moving part 402 may include the camera assembly 460 including the lens 461, a holder 470 including the magnets 471, 472, and 473, and the circuit board 464 including the image sensor 463. In various embodiments, the camera assembly 460 and the holder 470 may be coupled so as to be detachable from each other, or may be integrally formed with each other.

In an embodiment, the circuit board 464 may be disposed on a lower surface of the camera assembly 460 such that the image sensor 463 is aligned with the optical axis L of the lens 461. For example, the circuit board 464 may move together with the lens 461 when the moving part 402 moves (e.g., when the camera module 400 performs an image stabilization function), and therefore the distance between the circuit board 464 and the lens 461 may be maintained.

In an embodiment, the holder 470 may include the first magnet 471 facing the first coil 431, the second magnet 472 facing the second coil 432, and the third magnet 473 facing the third coil 433. In an embodiment, the holder 470 may further include yokes (not illustrated) that are disposed between the magnets 471, 472, and 473 and the lens 461. For example, the yokes may shield magnetic fields of the magnets 471, 472, and 473 such that the magnetic fields do not affect electric elements (e.g., the circuit board and the image sensor) disposed inside the camera assembly 460.

In the illustrated embodiment, the first magnet 471 may be disposed in the −X-axis direction, the second magnet 472 may be disposed in the −Y-axis direction, and the third magnet 473 may be disposed in the X-axis direction.

In an embodiment, when currents flow through the coils 431, 432, and 433, electromagnetic forces (e.g., Lorentz forces) may be applied to the magnets 471, 472, and 473 facing the coils 431, 432, and 433. The moving part 402 may be moved inside the camera housing 410 by the electromagnetic forces. For example, when a current flows through the first coil 431, an electromagnetic force may be applied to the first magnet 471 facing the first coil 431. For example, when a current flows through the second coil 432, an electromagnetic force may be applied to the second magnet 472 facing the second coil 432. For example, when a current flows through the third coil 433, an electromagnetic force may be applied to the third magnet 473 facing the third coil 433.

Figure 6:
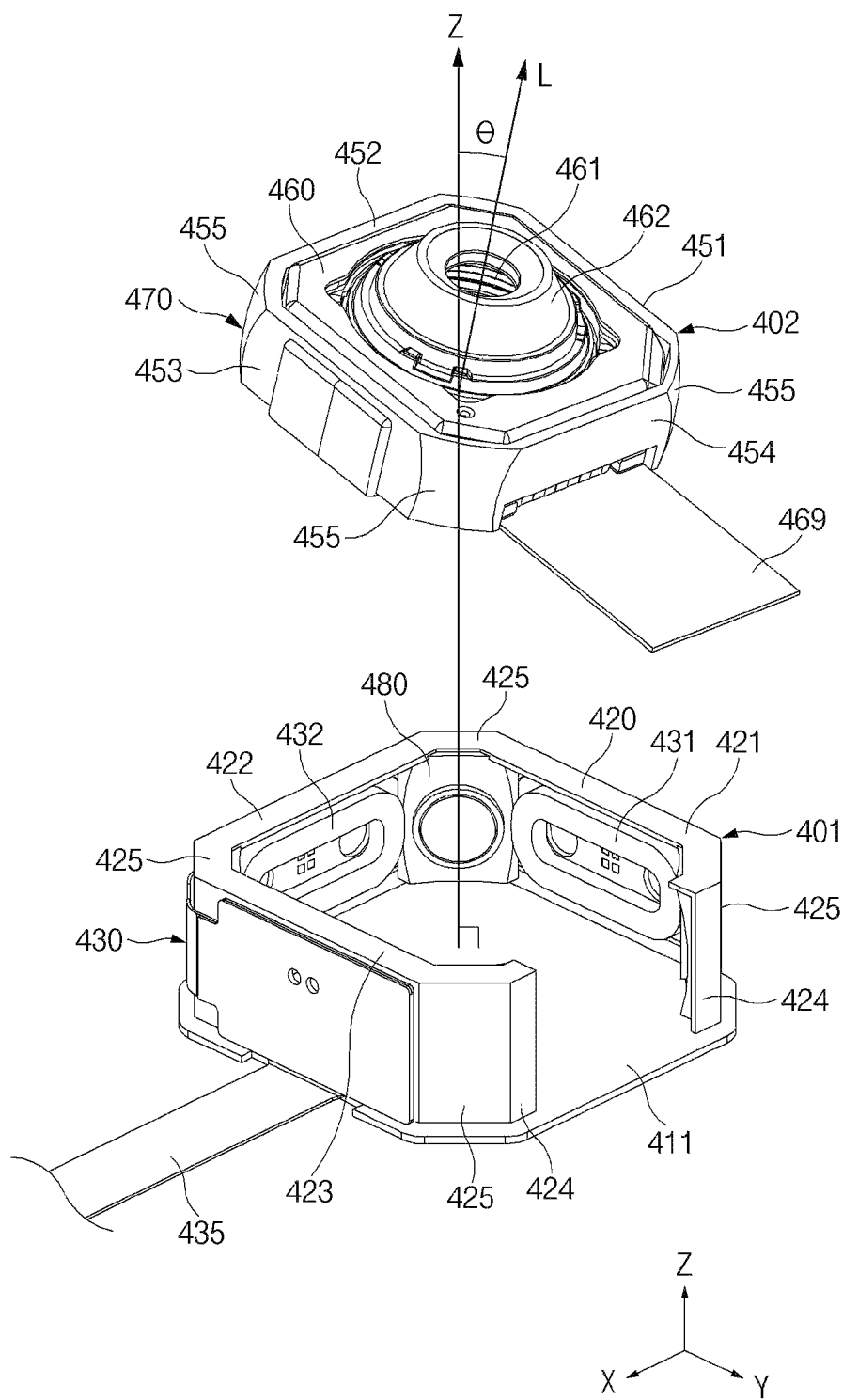
FIG. 6 is a view illustrating a movement of a moving part related to an image stabilization function of a camera module according to an embodiment of the disclosure.

FIG. 6 is a view illustrating a movement of a moving part related to an image stabilization function of a camera module according to an embodiment of the disclosure.

Referring to FIG. 6, the cover 412 is omitted from the camera module 400 illustrated in FIG. 4.

Referring to FIG. 6, a moving part 402 may move inside a camera housing 410 of a fixed part 401. For example, the moving part 402 may move such that the optical axis L of the lens 461 forms a predetermined angle θ with the Z-axis. For example, the moving part 402 may rotate about an axis of rotation parallel or perpendicular to the optical axis L of the lens 461.

According to an embodiment, rotary motion (e.g., 3-axis rotary motion) related to a movement of the moving part 402 may include rolling motion, pitching motion, or yawing motion. For example, motion related to an axis of rotation perpendicular to the optical axis L (e.g., an axis substantially parallel to a first diagonal line C1 of FIG. 9) may be defined as rolling motion, and motion related to any other axis of rotation perpendicular to the optical axis L (e.g., an axis substantially parallel to a second diagonal line C2 of FIG. 9) may be defined as pitching motion. Additionally, for example, motion related to an axis of rotation substantially parallel to (matching) the optical axis L may be defined as yawing motion. According to various embodiments, an axis of rotation parallel to the optical axis L may be an axis orthogonal to an orthogonal plane of the rolling motion and the pitching motion.

In various embodiments, the moving part 402 may be configured to rotate about the optical axis L and axes of rotation perpendicular to each other. The axes of rotation perpendicular to each other may include the X-axis and the Y-axis with respect to the drawing or vectors on an x-y plane. The axes of rotation perpendicular to each other may be perpendicular to the optical axis L in a state in which the moving part 402 is not rotated.

In an embodiment, the moving part 402 may be disposed such that at least part thereof is surrounded by the sidewall structure 420. For example, the camera assembly 460 and the holder 470 may be disposed such that the magnets 471, 472, and 473 disposed on the holder 470 face the coils 431, 432, and 433 disposed on the sidewall structure 420. In an embodiment, the second connecting member 469 extending from the camera assembly 460 may extend through the open area 4241 of the sidewall structure 420. In an embodiment, when the moving part 402 moves, the second connecting member 469 may deform, or may move together with the moving part 402.

In an embodiment, the base 411 of the camera housing 410 may be formed such that the normal vector thereof is substantially parallel to the Z-axis. For example, the moving part 402 may rotate inside the camera housing 410 such that the optical axis L of the lens 461 forms a predetermined angle with the normal vector of the base 411.

In an embodiment, the moving part 402 may include side areas 451, 452, 453, and 454 and the corner areas 455 at least partially facing the sidewall structure 420. The corner areas 455 may be formed between the side areas 451, 452, 453, and 454 adjacent to each other.

In an embodiment, the side areas 451, 452, 453, and 454 may include the first side area 451 on which the first magnet 471 is disposed, the second side area 452 on which the second magnet 472 is disposed, the third side area 453 on which the third magnet 473 is disposed, and the fourth side area 454 partially facing the open area 4241 of the sidewall structure 420.

In the illustrated embodiment, the first side area 451 may include a flat surface facing the −X-axis direction, the second side area 452 may include a flat surface facing the −Y-axis direction, the third side area 453 may include a flat surface facing the X-axis direction, and the fourth side area 454 may include a flat surface facing the Y-axis direction.

In an embodiment, the first side area 451 may face the first coil 431. The second side area 452 may face the second coil 432. The third side area 453 may face the third coil 433. In an embodiment, the side areas 451, 452, 453, and 454 may be spaced apart from the sidewall structure 420, which faces the side areas 451, 452, 453, and 454, by a predetermined gap. For example, the first side area 451 may be spaced apart from the first coil 431 by the predetermined gap. The second side area 452 may be spaced apart from the second coil 432 by the predetermined gap. The third side area 453 may be spaced apart from the third coil 433 by the predetermined gap. In an embodiment, the gap may be formed to be a space sufficient for a movement of the moving part 402.

In an embodiment, the corner areas 455 may face the support structures 480. For example, the corner areas 455 may make contact with one or more balls (e.g., one or more balls 481 of FIGS. 8A to 8C) that are contained in the support structures 480. In an embodiment, when the moving part 402 moves, the corner areas 455 may substantially make point contact with the sidewall structure 420 through the one or more balls 481.

In various embodiments, when the moving part 402 includes the holder 470, the side areas 451, 452, 453, and 454 and the corner areas 455 may include partial areas of an outer surface of the holder 470. In various embodiments, when the moving part 402 does not include the holder 470, the side areas 451, 452, 453, and 454 and the corner areas 455 may include parts of a surface of the camera assembly 460.

In an embodiment, when mechanical noise (e.g., vibration) is applied to the camera module 400 or the electronic device (e.g., the electronic device 300 of FIGS. 3A to 3C), the camera module 400 may perform an image stabilization function to reduce the noise. For example, the camera module 400 may apply currents to the coils 431, 432, and 433 to rotate the moving part 402, which includes the lens 461 and the image sensor 463, by a predetermined angle. Accordingly, the camera module 400 may obtain a stabilized image.

Figure 7A:
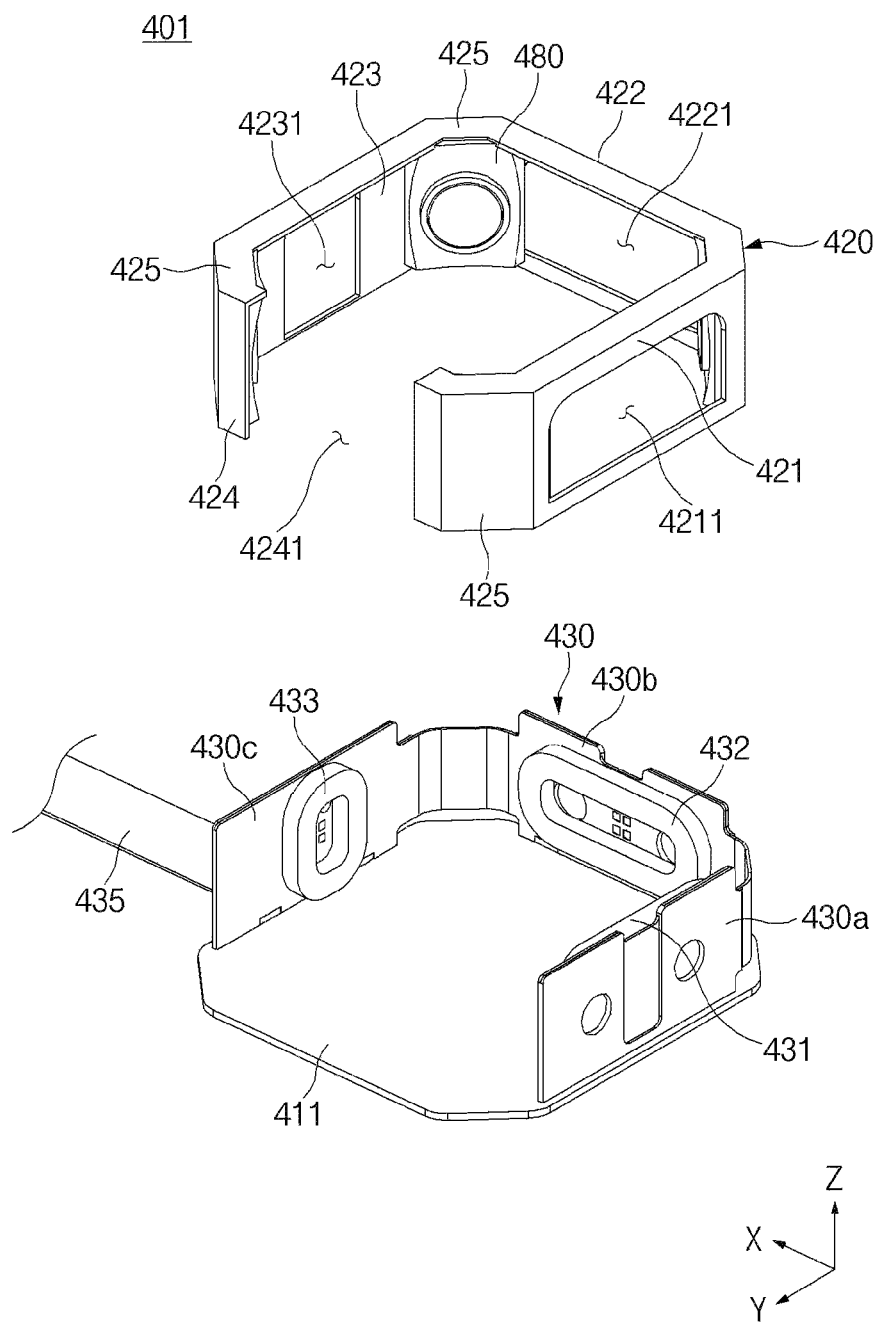
FIG. 7A is a view illustrating a fixed part of a camera module according to an embodiment of the disclosure.

FIG. 7A is a view illustrating a fixed part of a camera module according to an embodiment of the disclosure.

Figure 7B:
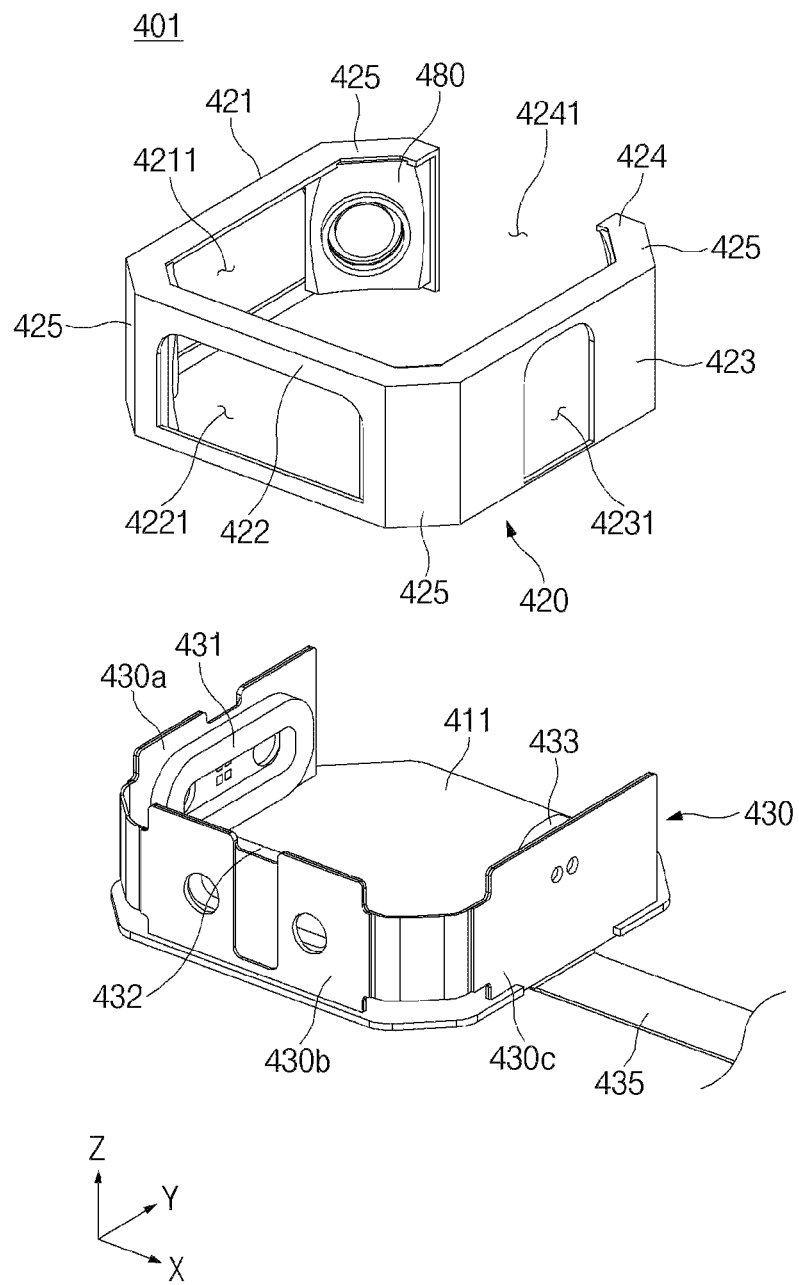
FIG. 7B is a view illustrating the fixed part of a camera module according to an embodiment of the disclosure.

FIG. 7B is a view illustrating a fixed part of a camera module according to an embodiment of the disclosure.

Referring to FIGS. 7A and 7B, a fixed part 401 may include a base 411, a sidewall structure 420 formed to surround a partial area of the base 411, a flexible circuit board 430 coupled to a sidewall structure 420, and coils 431, 432, and 433 disposed on the flexible circuit board 430.

In an embodiment, the sidewall structure 420 may include the sidewalls 421, 422, 423, and 424 and the support structures 480 disposed between the sidewalls 421, 422, 423, and 424. For example, the sidewalls 421, 422, 423, and 424 may include the first sidewall 421 on which the first coil 431 is disposed, the second sidewall 422 on which the second coil 432 is disposed, the third sidewall 423 on which the third coil 433 is disposed, and the fourth sidewall 424 that is partially open.

In an embodiment, the first sidewall 421 may have a first opening area 4211 formed therein in which the first coil 431 is located. The first coil 431 may form an inner surface of the camera housing 410 through the first opening area 4211. In an embodiment, the second sidewall 422 may have a second opening area 4221 formed therein in which the second coil 432 is located. The second coil 432 may form an inner surface of the camera housing 410 through the second opening area 4221. In an embodiment, the third sidewall 423 may have a third opening area 4231 formed therein in which the third coil 433 is located. The third coil 433 may form an inner surface of the camera housing 410 through the third opening area 4231. In an embodiment, the fourth sidewall 424 may have the open area 4241 formed therein through which a second connecting member (e.g., the second connecting member 469 of FIG. 6) extends.

In an embodiment, the support structures 480 may be disposed between the sidewalls 421, 422, 423, and 424. For example, the support structures 480 may be disposed on the corner sidewalls 425 formed between the adjacent sidewalls 421, 422, 423, and 424.

In an embodiment, the flexible circuit board 430 may extend to surround the first sidewall 421, the second sidewall 422, the third sidewall 423, and a part of the corner sidewalls 425. For example, the flexible circuit board 430 may include a first area 430a on which the first coil 431 is disposed, a second area 430b on which the second coil 432 is disposed, and a third area 430c on which the third coil 433 is disposed.

In an embodiment, the first area 430a of the flexible circuit board 430 may be coupled to the first sidewall 421 such that the first coil 431 is located in the first opening area 4211. In an embodiment, the second area 430b of the flexible circuit board 430 may be coupled to the second sidewall 422 such that the second coil 432 is located in the second opening area 4221. In an embodiment, the third area 430c of the flexible circuit board 430 may be coupled to the third sidewall 423 such that the third coil 433 is located in the third opening area 4231.

Figure 8A:
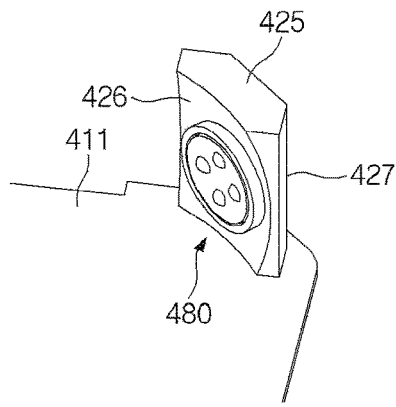
FIGS. 8A, 8B, and 8C are views illustrating a support structure of a camera module according to various embodiments of the disclosure.
Figure 8B:
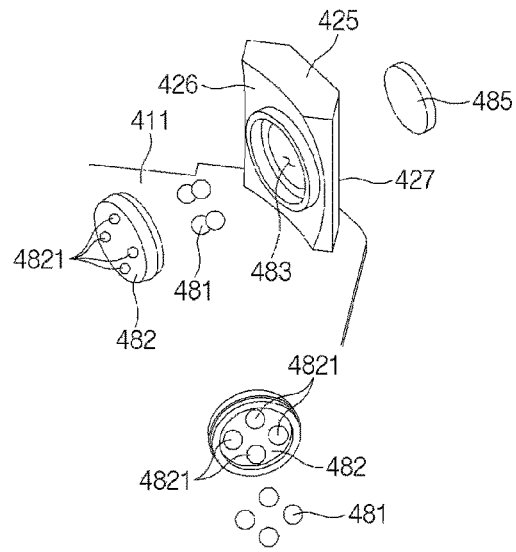
Figure 8C:
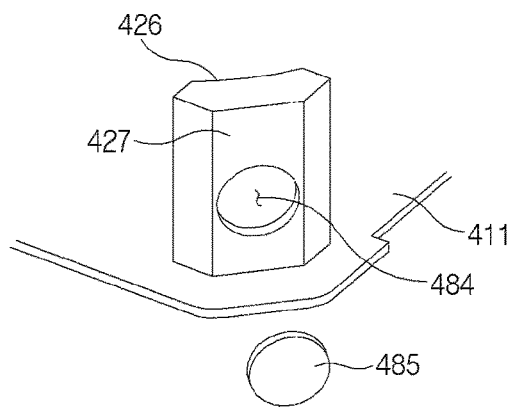

FIGS. 8A to 8C are views illustrating a support structure of a camera module according to various embodiments of the disclosure.

FIG. 8A is a perspective view of a support structure of a camera module.

FIG. 8B is an exploded perspective view of a support structure of a camera module.

FIG. 8C is an exploded perspective view of a support structure of a camera module.

Referring to FIGS. 8A to 8C, a support structure 480 may be formed on a corner sidewall 425 protruding from a base 411. In an embodiment, the support structure 480 may include the one or more balls 481 coupled to the corner sidewall 425 so as to be rotatable. For example, the one or more balls 481 may rotate in a state of being received in the corner sidewall 425. For example, the one or more balls 481 may rotate in a state in which the positions thereof are fixed in the corner sidewall 425. For example, the one or more balls 481 may be configured to roll along a surface of the moving part 402 when the moving part 402 moves.

In an embodiment, the support structure 480 may further include a first recess 483 that is formed on an inside surface 426 of the corner sidewall 425 and in which the one or more balls 481 are received, a fixing member 482 that is at least partially received in the first recess 483 and that surrounds at least parts of the one or more balls 481, a second recess 484 formed on an outside surface 427 of the corner sidewall 425, and a yoke 485 received in the second recess 484.

In an embodiment, the fixing member 482 may surround at least parts of the one or more balls 481 such that the one or more balls 481 are rotatable. For example, the fixing member 482 may include one or more openings 4821 in which the one or more balls 481 are received. The balls 481 may be located in the openings 4821, respectively. For example, parts of the one or more balls 481 may be exposed on the inside surface 426 of the corner sidewall 425 through the openings 4821 of the fixing member 482. At this time, the exposed parts of the balls 481 may make contact with a corner area (e.g., the corner area 455 of FIG. 6) of a moving part (e.g., the moving part 402 of FIG. 6).

In an embodiment, the yoke 485 may be disposed to face a fifth magnet (e.g., a fifth magnet 475 of FIG. 9) that is included in the moving part 402. The yoke 485 may form an attractive force together with the fifth magnet (e.g., the fifth magnet 475 of FIG. 9). The attractive force may act to maintain contact between the moving part 402 and the one or more balls 481.

In an embodiment, as the camera module 400 includes the one or more balls 481 disposed between the fixed part 401 and the moving part 402 and configured to roll depending on a movement of the moving part 402, the camera module 400 may provide a rolling frictional force when the moving part 402 moves. Accordingly, a frictional force between the moving part 402 and the fixed part 401 may be decreased when the camera module 400 performs an image stabilization function. Thus, the camera module 400 may smoothly operate the moving part 402 while consuming a relatively small amount of energy.

Figure 9:
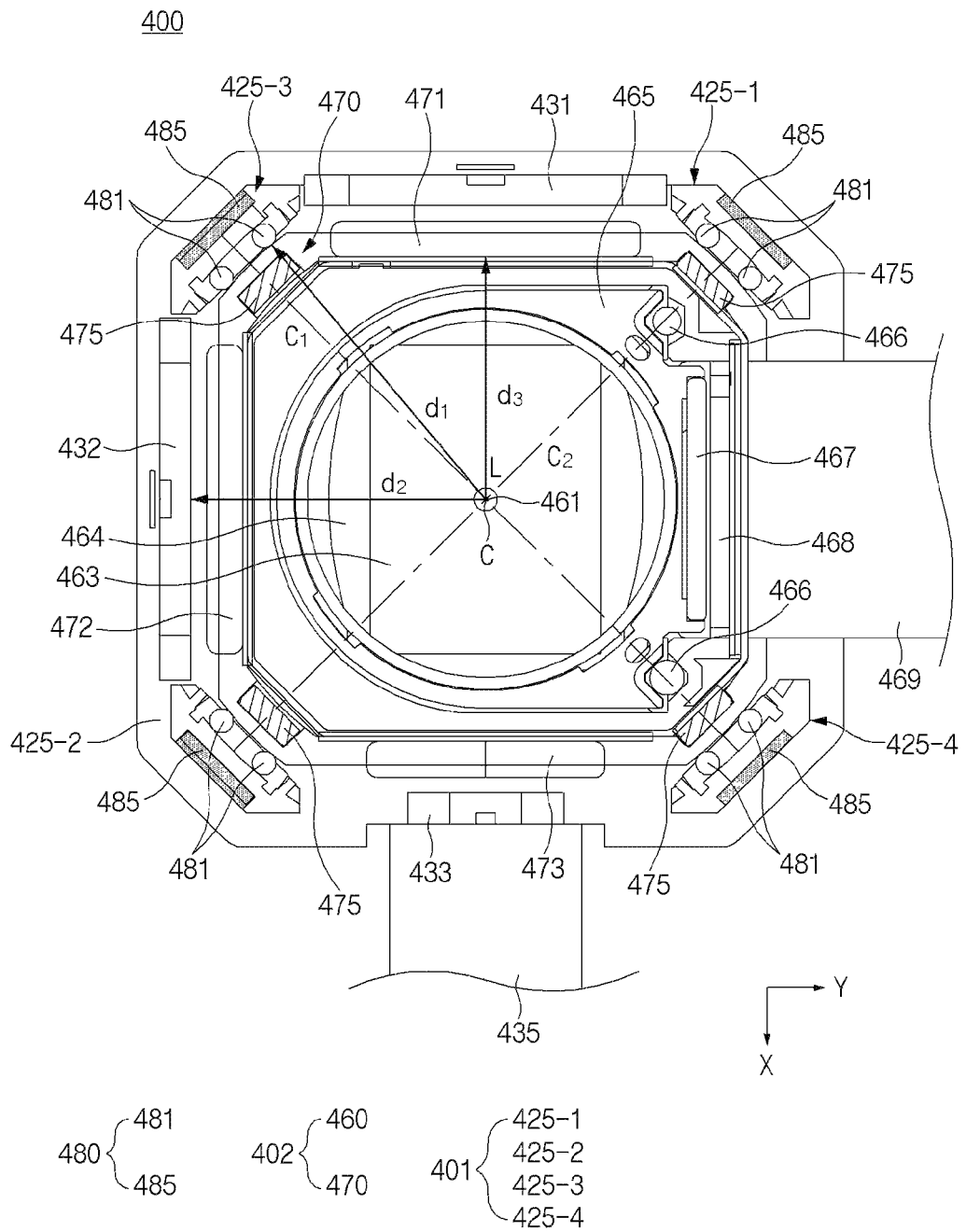
FIG. 9 is a view illustrating a moving part, a fixed part, and balls of a camera module according to an embodiment of the disclosure.

FIG. 9 is a view illustrating a moving part, a fixed part, and balls of a camera module according to an embodiment of the disclosure.

FIG. 9 is a sectional view of a camera module of FIG. 4 in an x-y plane.

Figure 10A:
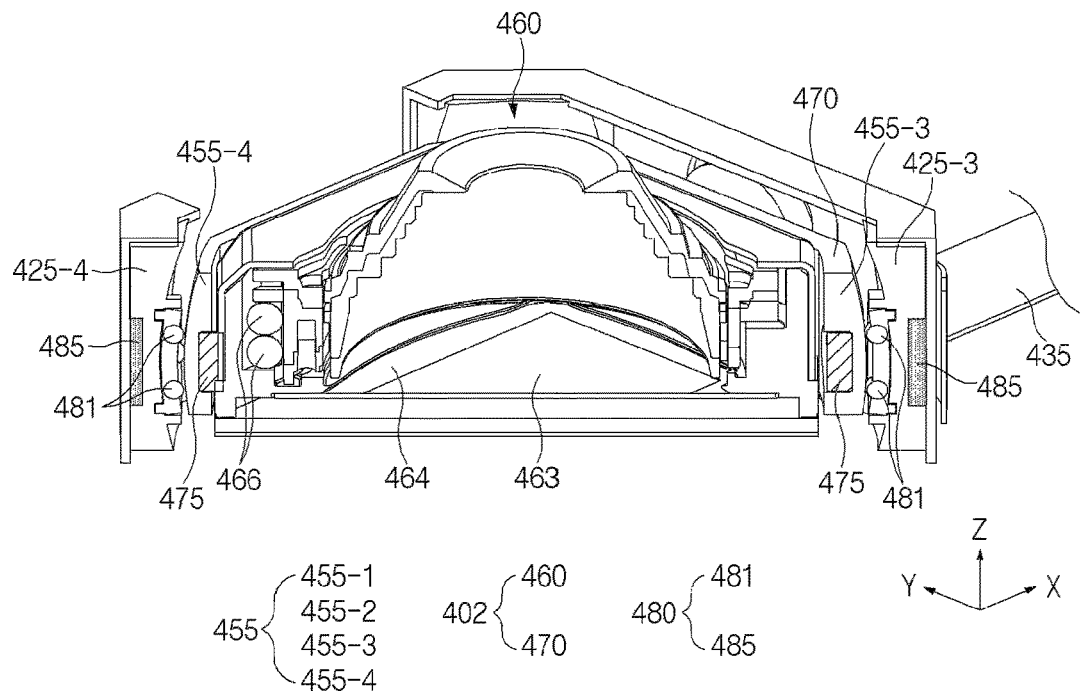
FIGS. 10A and 10B are views illustrating a moving part, a fixed part, and balls of a camera module according to various embodiments of the disclosure.
Figure 10B:
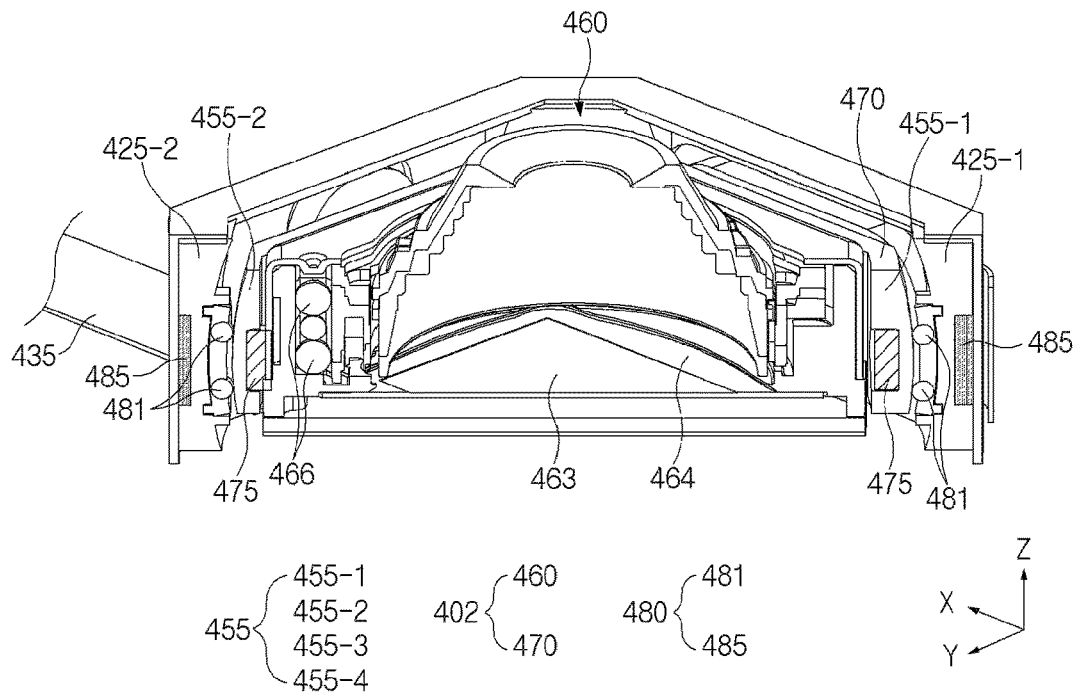

FIGS. 10A and 10B are views illustrating a moving part, a fixed part, and balls of a camera module according to an embodiment of the disclosure.

FIG. 10A is a sectional view of a camera module taken along line C2 in FIG. 9.

FIG. 10B is a sectional view of a camera module taken along line C1 in FIG. 9.

In an embodiment, the fixed part 401 may include the first coil 431, the second coil 432, the third coil 433, and the support structures 480. In an embodiment, the first coil 431 may face the first magnet 471. The second coil 432 may face the second magnet 472. The third coil 433 may face the third magnet 473.

Referring to FIGS. 9, 10A, and 10B, a moving part 402 may include a first corner area 455-1 facing a first corner sidewall 425-1, a second corner area 455-2 facing a second corner sidewall 425-2, a third corner area 455-3 facing a third corner sidewall 425-3, and a fourth corner area 455-4 facing a fourth corner sidewall 425-4.

In an embodiment, the support structures 480 may each include the one or more balls 481 and the yoke 485. In an embodiment, the support structures 480 may be formed on the corner sidewalls 425. The one or more balls 481 included in the support structures 480 may make contact with the corner areas 455 of the moving part 402. For example, the one or more balls 481 may substantially make point contact with the corner areas 455. For example, the positions of the one or more balls 481 relative to the corner sidewalls 425 may be fixed, but when the moving part 402 moves, the one or more balls 481 may roll along the corner areas 455 of the moving part 402.

In an embodiment, the yokes 485 may be disposed to face the fifth magnets 475, which are disposed on the moving part 402, with the balls 481 therebetween. For example, the fifth magnets 475 may be disposed on the holder 470 of the moving part 402. At this time, the yokes 485, together with the fifth magnets 475, may form attractive forces to pull the corner areas 455 of the moving part 402 to the corner sidewalls 425 of the fixed part 401.

In various embodiments, the yokes 485 may be disposed on the corner sidewalls 425, and the fifth magnets 475 may be disposed on the corner areas 455 of the moving part 402. In various embodiments, two or more magnets (not illustrated) that have different polarities to form an attractive force and that face each other may be disposed on the corner sidewalls 425 and the corner areas 455.

In an embodiment, the moving part 402 may include the camera assembly 460 and the holder 470 surrounding the camera assembly 460. In an embodiment, the moving part 402 may be movably connected with the fixed part 401 through the one or more balls 481. For example, as the one or more balls 481 roll on surfaces (e.g., the corner areas 455) of the moving part 402, a movement of the moving part 402 may be supported.

Referring to FIGS. 9, 10A, and 10B, a camera assembly 460 may include a second camera housing (e.g., a second camera housing 460-1 and 460-2 of FIG. 16), a lens carrier 465, the circuit board 464, a fourth magnet 467, and a fourth coil 468. In an embodiment, one or more balls 466 may be disposed inside the camera assembly 460. The balls 466 may be configured to provide rolling frictional forces when the lens carrier 465 moves in the direction of the optical axis L for an auto focus function.

In an embodiment, the camera module 400 may include the first connecting member 435 connected with electrical components (e.g., the coils 431, 432, and 433) disposed on the fixed part 401 and the second connecting member 469 connected with electrical components (e.g., the image sensor 463 and the fourth coil 468) disposed on the moving part 402. For example, the second connecting member 469 may be connected, or integrally formed, with the circuit board 464.

In an embodiment, the first connecting member 435 and the second connecting member 469 may extend in different directions. Referring to the drawings, the second connecting member 469 may extend outside the camera housing 410 through the open area 4241 of the sidewall structure 420 of the camera housing 410. Referring to the drawings, the first connecting member 435 may extend through an area of the sidewall structure 420 of the camera housing 410 where a coil (e.g., the third coil 433) is disposed.

In an embodiment, the one or more balls 481 may be disposed between the corner areas 455 of the moving part 402 and the corner sidewalls 425 of the fixed part 401. For example, the one or more balls 481 may roll along the corner areas 455 of the moving part 402 when the moving part 402 rotates. At this time, the one or more balls 481 may be coupled to the corner sidewalls 425 to rotate in place. In some embodiments (e.g., FIGS. 13, 14, and 15), the one or more balls 481 may be coupled to the moving part 402 so as to be rotatable and may be configured to roll along inner surfaces (e.g., the inside surfaces 426 of FIGS. 8A to 8C) of the corner sidewalls 425 of the fixed part 401.

In an embodiment, when viewed with respect to the optical axis L of the lens 461, the one or more balls 481 may be located at a first distance d1 from the optical axis L of the lens 461. When viewed with respect to the optical axis L of the lens 461, coils (e.g., the first coil 431, the second coil 432, and the third coil 433) may be located at a second distance d2 from the optical axis L of the lens 461, the second distance d2 being smaller than the first distance d1. When viewed with respect to the optical axis L of the lens 461, magnets (e.g., the first magnet 471, the second magnet 472, and the third magnet 473) may be located at a third distance d3 from the optical axis L of the lens 461, the third distance d3 being smaller than the first distance d1. Furthermore, the second distance d2 may be greater than the third distance d3. For example, the first distance d1, the second distance d2, and the third distance d3 may be distances measured from a center C of rotation of the optical axis L of the lens 461 in directions perpendicular to the optical axis L of the lens 461.

In the illustrated embodiment, side surfaces facing the sidewall structure 420 of the fixed part 401 may be defined on the moving part 402. The side surfaces may include side areas (e.g., the side areas 451, 452, 453, and 454 of FIG. 6) that have a relatively large area and the corner areas 455 that are formed between the side areas and that have a relatively small area. The camera module 400 according to an embodiment may be configured such that the magnets 471, 472, and 473 are disposed on the side areas 451, 452, and 453 having a relatively large area and the one or more balls 481 make contact with the corner areas 455 having a relatively small area. Accordingly, the magnets 471, 472, and 473 and the coils 431, 432, and 433 having sizes sufficient to drive the moving part 402 may be provided in the camera module 400. Although the one or more balls 481 are disposed between the corner areas 455 having a relatively small area and the corner sidewalls 425, the one or more balls 481 may provide rolling frictional forces between the moving part 402 and the fixed part 401.

Referring to FIGS. 9, 10A, and 10B, support structures 480 may be disposed on a first corner sidewall 425-1, a second corner sidewall 425-2, a third corner sidewall 425-3, and a fourth corner sidewall 425-4. The first corner sidewall 425-1 may face the second corner sidewall 425-2 in the direction of the second diagonal line C2. The third corner sidewall 425-3 may face the fourth corner sidewall 425-4 in the direction of the first diagonal line C1. In various embodiments, the diagonal lines C1 and C2 illustrated in FIGS. 9, 10A, and 10B may intersect with the optical axis L of the lens 461 at substantially one point. The one point may be referred to as the center C of rotation of the moving part 402.

In various embodiments, referring to FIGS. 9, 10A and 10B, the support structures 480 are illustrated as being disposed on the corner sidewalls 425 of the fixed part 401, respectively. However, without being necessarily limited thereto, the support structures 480 may be disposed on some of the corner sidewalls 425. For example, the one or more balls 481 and the fifth magnets 475 corresponding thereto may not be disposed on some of the corner sidewalls 425 and some of the corner areas 455 corresponding thereto.

In various embodiments, the support structures 480 (e.g., second support structures 490 of FIGS. 14 and 15) may be disposed on the corner areas 455-1, 455-2, 455-3, and 455-4 of the moving part 402, respectively, and the fifth magnets 475 may be disposed on the corner sidewalls 425-1, 425-2, 425-3, and 425-4 of the fixed part 401, respectively.

In various embodiments, the support structures 480 and the fifth magnets 475 may be symmetrically disposed in the camera module 400. For example, the support structures 480 may be disposed on the first corner sidewall 425-1 and the second corner sidewall 425-2 of the fixed part 401, and the fifth magnets 475 corresponding to the support structures 480 may be disposed on the first corner area 455-1 and the second corner area 455-2 of the moving part 402. Furthermore, the fifth magnets 475 may be disposed on the third corner sidewall 425-3 and the fourth corner sidewall 425-4 of the fixed part 401, and the support structures 480 (e.g., the second support structures 490 of FIGS. 14 and 15) that correspond to the fifth magnets 475 may be disposed on the third corner area 455-3 and the fourth corner area 455-4 of the moving part 402. The positions of the support structures 480 and the fifth magnets 475 are not limited to the illustrated embodiment and may be changed depending on various embodiments.

In an embodiment, the moving part 402 may include the first magnet 471, the second magnet 472, the third magnet 473, the fourth magnet 467, and the fifth magnets 475.

In an embodiment, the first magnet 471, the second magnet 472, and the third magnet 473 may be magnets related to an image stabilization function of the camera module 400. For example, the first magnet 471, the second magnet 472, and the third magnet 473 may be disposed on side areas (e.g., the holder 470) of the moving part 402.

In an embodiment, the fifth magnets 475 may be disposed to be exposed on surfaces (e.g., the holder 470) of the moving part 402, or may be disposed inside the moving part 402 (e.g., the holder 470).

In an embodiment, the fourth magnet 467 may be a magnet related to an auto focus function of the camera module 400. For example, the fourth magnet 467 may be disposed inside the moving part 402 (e.g., inside the camera assembly 460). For example, the fourth magnet 467 may be disposed closer to the optical axis L of the lens 461 than the first magnet 471, the second magnet 472, and the third magnet 473. The auto focus function of the camera assembly 460 will be described below with reference to FIG. 16.

When viewed with respect to the optical axis L of the lens 461, the first magnet 471 and the first coil 431 may be disposed in the −X-axis direction. The second magnet 472 and the second coil 432 may be disposed in the −Y-axis direction. The third magnet 473 and the third coil 433 may be disposed in the X-axis direction. The fourth magnet 467 and the fourth coil 468 may be disposed in the Y-axis direction. For example, the fourth magnet 467 may be disposed adjacent to a fourth sidewall (e.g., the fourth sidewall 424 of FIG. 6) of the sidewall structure 420. In an embodiment, the magnets 471, 472, 473, and 467 may be disposed in different directions so as not to overlap each other. In an embodiment, the coils 431, 432, 433, and 468 may be disposed in different directions so as not to overlap each other.

In an embodiment, when viewed with respect to the optical axis L of the lens 461, the balls 481 may be disposed in directions not overlapping the directions in which the magnets 471, 472, 473, and 467 and the coils 431, 432, 433, and 468 are disposed.

Figure 11A:
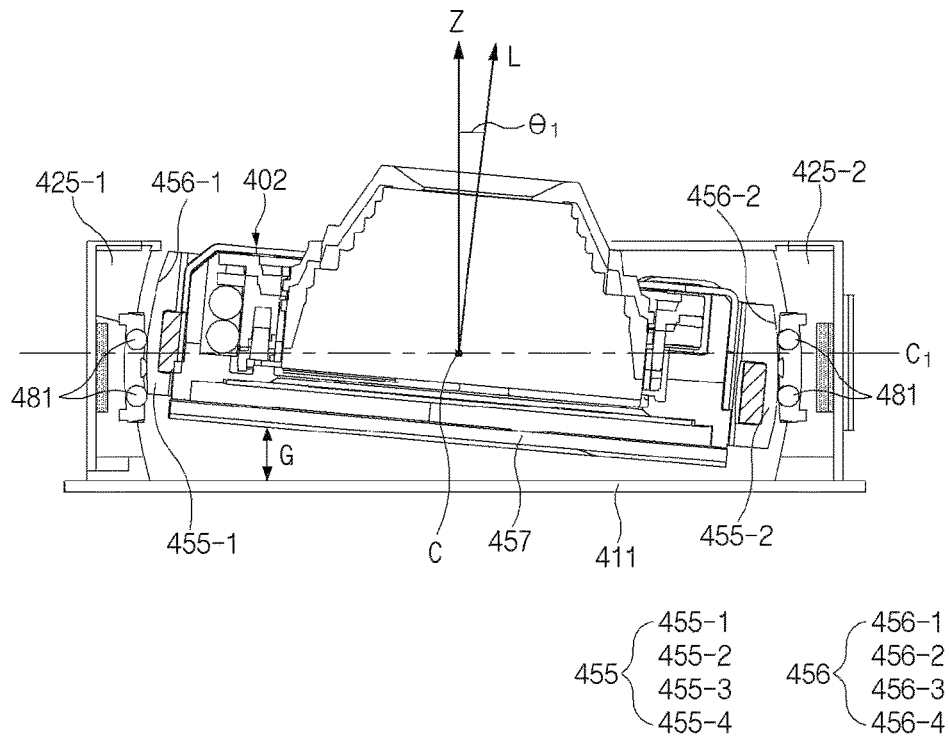
FIGS. 11A and 11B are views illustrating a movement of a moving part of a camera module according to various embodiments of the disclosure.
Figure 11B:
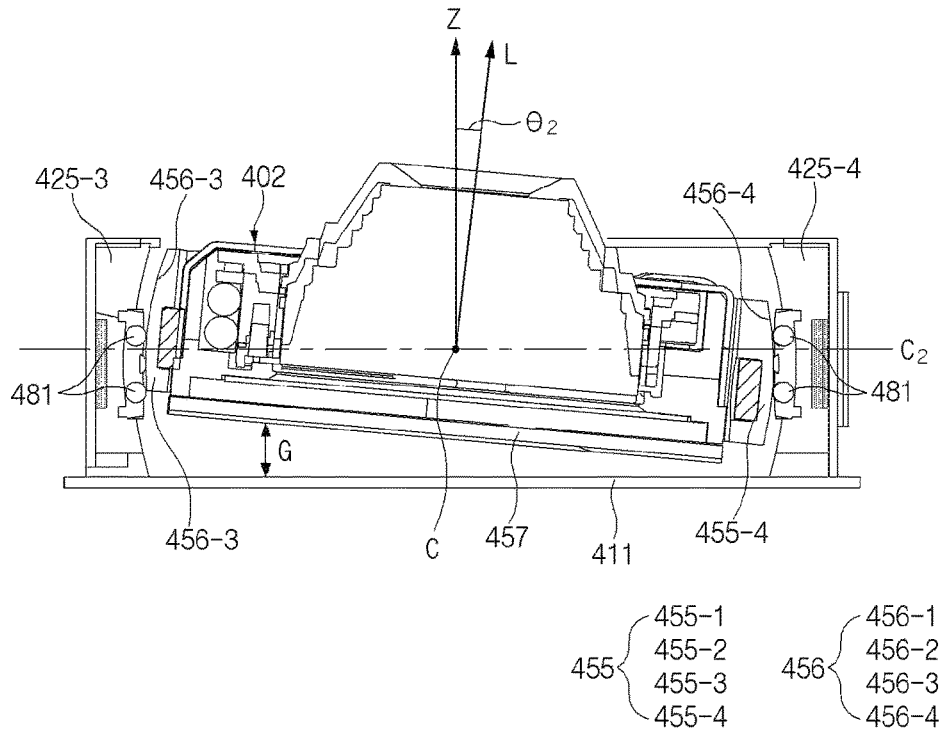

FIGS. 11A and 11B are views illustrating a movement of a moving part of a camera module according to an embodiment of the disclosure.

FIG. 11A is a view illustrating a moving part rotating about the second diagonal line C2 (e.g., C2 of FIG. 9) of a camera module according to an embodiment.

FIG. 11B is a view illustrating a moving part rotating about the first diagonal line C1 (e.g., C1 of FIG. 9) of a camera module according to an embodiment.

Referring to FIGS. 11A and 11B, a moving part 402 may be configured to be movable inside a camera housing 410. For example, the moving part 402 may be configured to rotate about the center C of rotation. For example, the moving part 402 may rotate about the second diagonal line C2 such that the optical axis L of the lens 461 forms a predetermined first angle θ1 with the Z-axis. For example, the moving part 402 may rotate about the first diagonal line C1 such that the optical axis L of the lens 461 forms a predetermined second angle θ2 with the Z-axis.

In an embodiment, the center C of rotation of the moving part 402 may be a virtual point through which the optical axis L of the lens 461 passes and may be defined as a virtual point at which the first diagonal line C1 and the second diagonal line C2 intersect each other. In various embodiments, the center C of rotation may be a center point of the image sensor 463.

In the illustrated embodiment, when the moving part 402 rotates, the balls 481 may roll while making contact with partial areas of the corner areas 455 of the moving part 402. The areas of the corner areas 455 with which the balls 481 make contact may be defined as contact areas 456. In an embodiment, the contact areas 456 may be formed of spherical surfaces. At this time, the centers of the spherical surfaces may substantially match the center C of rotation of the moving part 402.

The first corner area 455-1 and the second corner area 455-2 illustrated in FIG. 11A may face each other in the direction of the first diagonal line C1 in the moving part 402.

Referring to FIG. 11A, a first contact area 456-1 included in a first corner area 455-1 of a moving part 402 may be formed of a spherical surface with the center C of rotation as the center thereof. A second contact area 456-2 included in the second corner area 455-2 of the moving part 402 may be formed of a spherical surface with the center C of rotation as the center thereof. For example, the first contact area 456-1 and the second contact area 456-2 may be formed of spherical surfaces that form substantially the same virtual sphere. Accordingly, the moving part 402 may rotate about the center C of rotation while maintaining point contact with the balls 481. In an embodiment, the first contact area 456-1 and the second contact area 456-2 may have an area corresponding to an angle by which the moving part 402 is rotatable.

The third corner area 455-3 and the fourth corner area 455-4 illustrated in FIG. 11B may face each other in the direction of the second diagonal line C2 in the moving part 402.

Referring to FIG. 11B, a third contact area 456-3 included in a third corner area 455-3 of a moving part 402 may be formed of a spherical surface with the center C of rotation as the center thereof. A fourth contact area 456-4 included in the fourth corner area 455-4 of the moving part 402 may be formed of a spherical surface with the center C of rotation as the center thereof. For example, the third contact area 456-3 and the fourth contact area 456-4 may be formed of spherical surfaces that form substantially the same virtual sphere. Accordingly, the moving part 402 may rotate about the center C of rotation while maintaining point contact with the balls 481. In an embodiment, the third contact area 456-3 and the fourth contact area 456-4 may have an area corresponding to an angle by which the moving part 402 is rotatable.

In an embodiment, a plurality of balls 481 may be formed. For example, the plurality of balls 481 may be configured such that at least one thereof makes contact with each of the corner areas 455. In an embodiment, the balls 481 may be coupled to the inner surfaces of the corner sidewalls 425 so as to be rotatable. The balls 481 may be coupled to the inner surfaces of the corner sidewalls 425 so as to be rotatable in place. For example, fixing members (e.g., the fixing members 482 of FIGS. 8A to 8C) in which the balls 481 are received so as to be rotatable may be disposed on the inner surfaces of the corner sidewalls 425. In some embodiments (not illustrated), recesses in which the balls 481 are received so as to be rotatable may be formed on the inner surfaces of the corner sidewalls 425.

The first corner sidewall 425-1 and the second corner sidewall 425-2 illustrated in FIG. 11A may face each other in the direction of the first diagonal line C1 in the fixed part 401.

Referring to FIG. 11A, a partial area of an inner surface of a first corner sidewall 425-1 may be formed of a spherical surface with the center C of rotation of the moving part 402 as the center thereof. For example, the spherical surface may correspond to the spherical surface of the first contact area 456-1. In various embodiments, a partial area of an inner surface of the second corner sidewall 425-2 may be formed of a spherical surface with the center C of rotation of the moving part 402 as the center thereof. For example, the spherical surface may correspond to the spherical surface of the second contact area 456-2.

The third corner sidewall 425-3 and the fourth corner sidewall 425-4 illustrated in FIG. 11B may face each other in the direction of the first diagonal line C2 in the fixed part 401.

Referring to FIG. 11B, a partial area of an inner surface of a third corner sidewall 425-3 may be formed of a spherical surface with the center C of rotation of a moving part 402 as the center thereof. For example, the spherical surface may correspond to the spherical surface of the third contact area 456-3. In various embodiments, a partial area of an inner surface of the fourth corner sidewall 425-4 may be formed of a spherical surface with the center C of rotation of the moving part 402 as the center thereof. For example, the spherical surface may correspond to the spherical surface of the fourth contact area 456-4.

In an embodiment, the base 411 of the camera housing 410 and a lower surface 457 of the moving part 402 may be spaced apart from each other by the predetermined gap G. At this time, the predetermined gap G may vary depending on rotation of the moving part 402. The predetermined gap G may form a space by which the moving part 402 is rotatable.

In an embodiment, the corner areas 455 of the moving part 402 may be formed of convex spherical surfaces such that the lower surface 457 of the moving part 402 is spaced apart from the base 411 of the camera housing 410 by the predetermined gap G. For example, the convex spherical surfaces of the corner areas 455 may be supported by the inner surfaces of the corner sidewalls 425 that are formed to be relatively concave and may maintain at least a predetermined gap from the base 411.

In an embodiment (not illustrated), the lower surface 457 of the moving part 402 may be formed to have different thicknesses. For example, the lower surface 457 may include a central area on which at least part of the image sensor 463 is disposed and a step area that surrounds the central area and that is formed in a step manner, compared to the central area. For example, the step area may be formed such that the vertical distance (e.g., gap) from the base 411 to the lower surface 457 (e.g., a peripheral area of the lower surface 457) in the Z-axis direction is greater than the vertical distance (e.g., gap) of the central area when the moving part 402 is a default state. For example, the lower surface 457 may be formed in a stepped shape. The default state may refer to, for example, a state in which the moving part 402 does not perform rotary motion and the Z-axis and the optical axis L are substantially parallel to each other.

In an embodiment, the lower surface 457 may include a central area on which at least part of the image sensor 463 is disposed and an inclined area that surrounds the central area and that is formed in a step manner, compared to the central area. The inclined area may be an area obliquely extending from the central area when viewed in a cross-section. The inclined area may be formed such that a lower surface (e.g., a surface facing the −Z-axis direction) of the circuit board 464 is inclined upward in a positive direction +L of the optical axis L. In various embodiments, the inclined area may have a smaller thickness than the central area. The inclined area may have a gradually decreasing thickness from the central area toward the periphery of the circuit board 464.

In an embodiment, when the moving part 402 moves (e.g., rotates), the vertical distance between the lower surface 457 and the base 411 may be related to the distance measured from the optical axis L of the lens 461 to the step area of the lower surface 457 in a direction perpendicular to the optical axis L. For example, the point at which the step area of the lower surface 457 starts may move more in a direction toward the base 411 with an increase in the distance from the optical axis L. Accordingly, the step area may be formed in an area relatively far away from the optical axis L to maintain the gap from the base 411 as small as possible.

In an embodiment (not illustrated), the circuit board 464 may have, in an upper surface thereof (e.g., a surface facing the Z-axis direction), a recess or opening in which the image sensor 463 is received. For example, the camera module 400 may be made compact by locating the circuit board 464 closer to the base 411. In an embodiment, the image sensor 463 may be disposed in a chip on film (COF) form, or at least part of the image sensor 463 may be formed to be a curved surface. For example, the curved surface may be formed such that, when viewed with respect to the image sensor 463, the center of curvature is located in the direction in which the lens 461 is located (e.g., in an upper direction with respect to the drawing). For example, the image sensor 463 may be formed to be convex in a lower direction with respect to the drawing (e.g., in a direction toward the base 411). In various embodiments, the center of curvature of the curved surface may match the center C of rotation.

Figure 12:
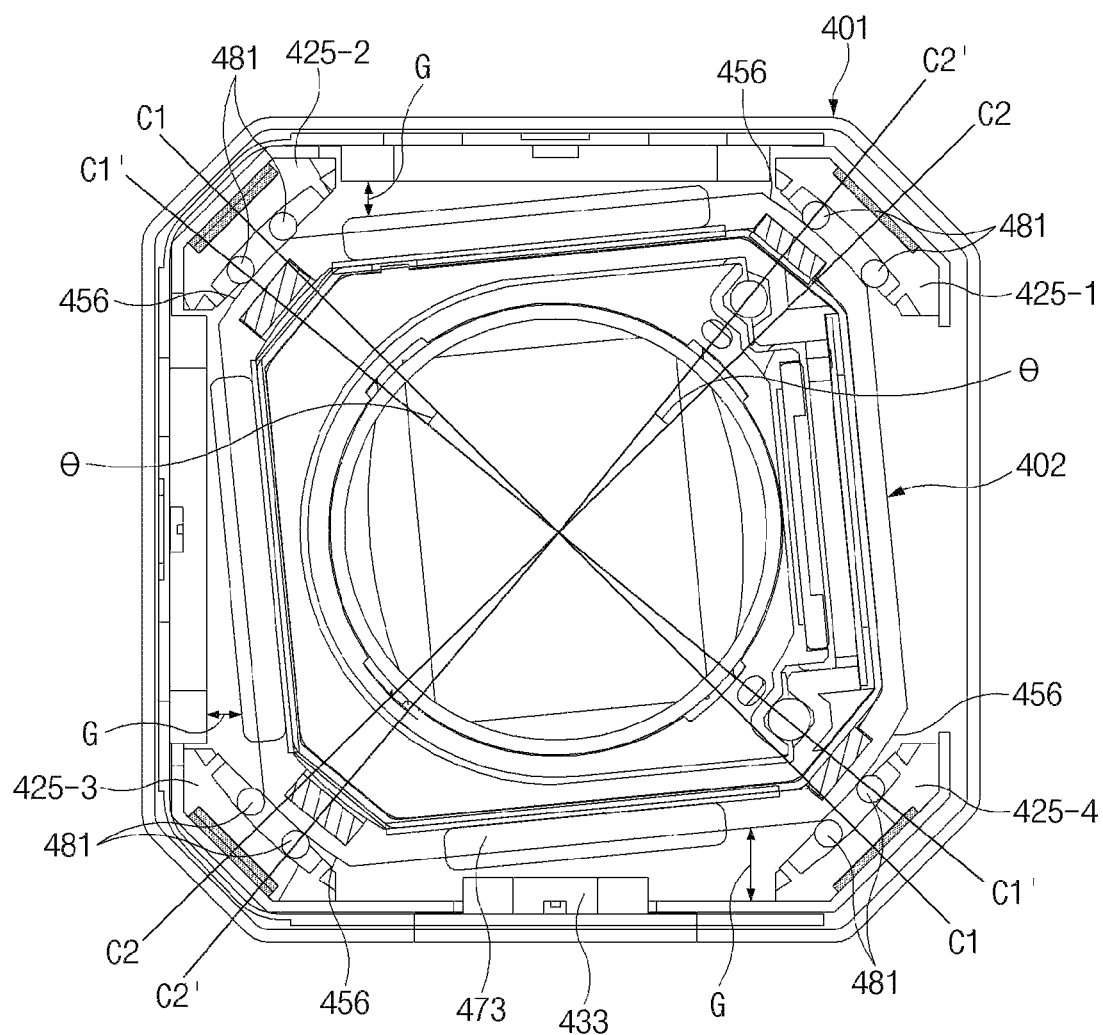
FIG. 12 is a view illustrating an operation of a moving part of a camera module according to an embodiment of the disclosure.

FIG. 12 is a view illustrating an operation of a moving part of a camera module according to an embodiment of the disclosure.

Referring to FIG. 12, a moving part 402 may be configured to be movable inside a camera housing 410. For example, the moving part 402 may be configured to rotate about the optical axis L of the lens 461.

In the illustrated embodiment, when the moving part 402 rotates, the balls 481 may roll while making contact with the contact areas 456 of the corner areas 455 of the moving part 402. In an embodiment, the contact areas 456 may be formed of spherical surfaces. At this time, the centers of the spherical surfaces may substantially match the center C of rotation through which the optical axis L of the lens 461 passes.

In an embodiment, the balls 481 may be coupled to the corner sidewalls 425 of the fixed part 401 so as to be rotatable and may roll along the contact areas 456 of the corner areas 455 of the moving part 402 when the moving part 402 rotates.

In an embodiment, the contact areas 456 of the corner areas 455 may be formed of spherical surfaces. For example, the spherical surfaces may be parts of a virtual sphere with the center C of rotation as the center thereof. In the illustrated embodiment, the contact areas 456 included in the respective corner areas 455 may form one virtual sphere having substantially the same center. Accordingly, the moving part 402 may rotate about the center C of rotation while maintaining point contact with the balls 481.

In various embodiments, the corner sidewalls 425 may be formed of spherical surfaces corresponding to the contact areas 456 of the corner areas 455. For example, at least partial areas of the corner sidewalls 425 may have a smaller curvature (e.g., a larger radius of curvature) than the contact areas 456.

In an embodiment, the side surfaces of the moving part 402 may be spaced apart from the sidewalls of the fixed part 401 by a predetermined gap G. At this time, the predetermined gap G may vary depending on rotation of the moving part 402. The predetermined gap G may form a space by which the moving part 402 is rotatable.

In an embodiment, the moving part 402 may rotate about the optical axis L of the lens 461 by an interaction between the third coil 433 and the third magnet 473 facing the third coil 433. For example, when the third coil 433 is located in a magnetic field formed by the third magnet 473 and a current is applied to the third coil 433, an electromagnetic force (e.g., Lorentz force) may act on the third coil 433. At this time, the moving part 402 including the third magnet 473 may move because the third coil 433 is located on the fixed part 401, the position of which is fixed.

In an embodiment, when a current flows through the third coil 433 in an opposite direction, the moving part 402 may rotate in an opposite direction. In an embodiment, the strength of a current flowing through the third coil 433 may be related to the rotation angle θ of the moving part 402.

In an embodiment, a processor (e.g., the processor 120 of FIG. 1) may rotate the moving part 402 about the optical axis L by controlling the direction and/or strength of a current flowing through the third coil 433. For example, the movement (e.g., rotation) related to the third coil 433 may be defined as yawing motion. In an embodiment, when the moving part 402 rotates about the optical axis L, the diagonal directions (e.g., the first diagonal line C1 and the second diagonal line C2) in which the corner areas 455-1, 455-2, 455-3, and 455-4 of the moving part 402 and the corner sidewalls 425-1, 425-2, 425-3, and 425-4 face each other may be moved to different diagonal directions (e.g., a third diagonal line C1' and a fourth diagonal line C2').

Figure 13:
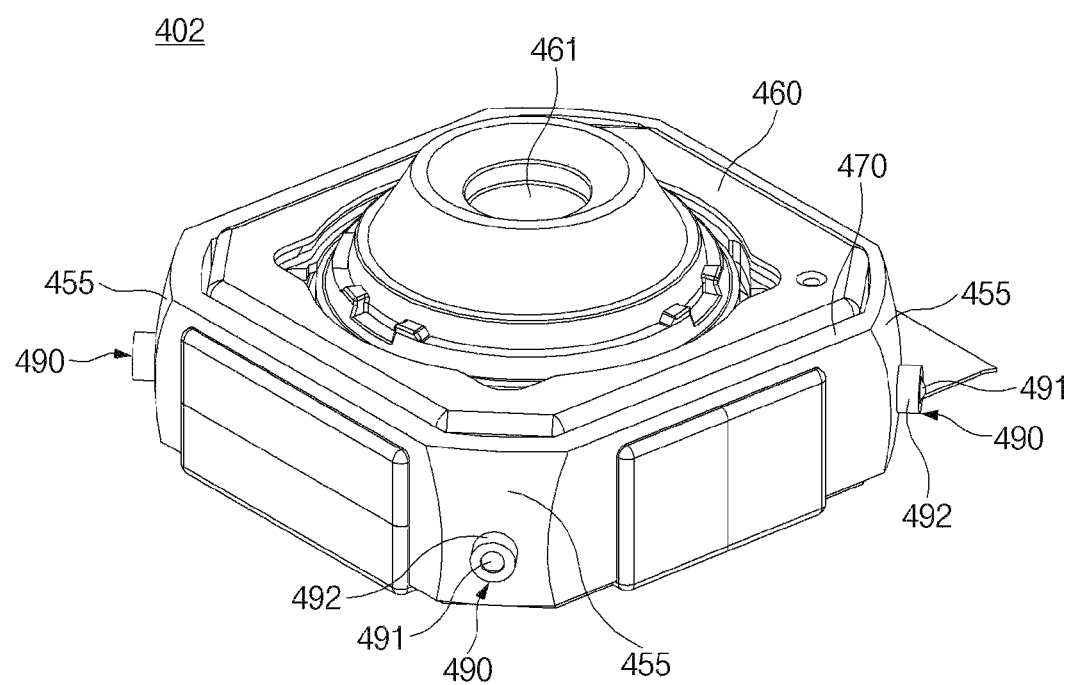
FIG. 13 is a view illustrating a moving part of a camera module according to an embodiment of the disclosure.

FIG. 13 is a view illustrating a moving part of a camera module according to another embodiment of the disclosure.

Figure 14:
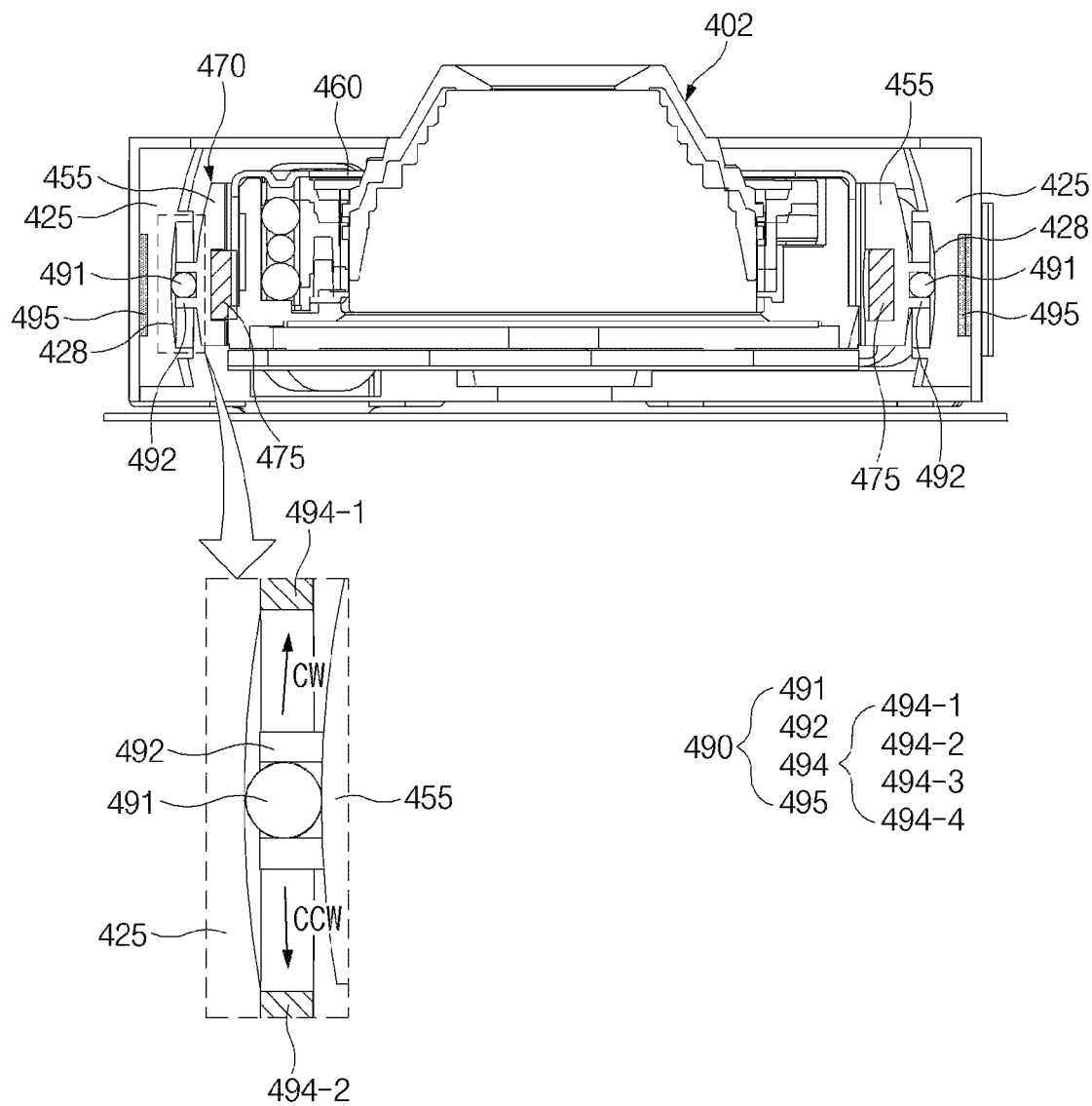
FIG. 14 is a sectional view illustrating a camera module according to an embodiment of the disclosure.

FIG. 14 is a sectional view illustrating a camera module according to an embodiment of the disclosure.

Figure 15:
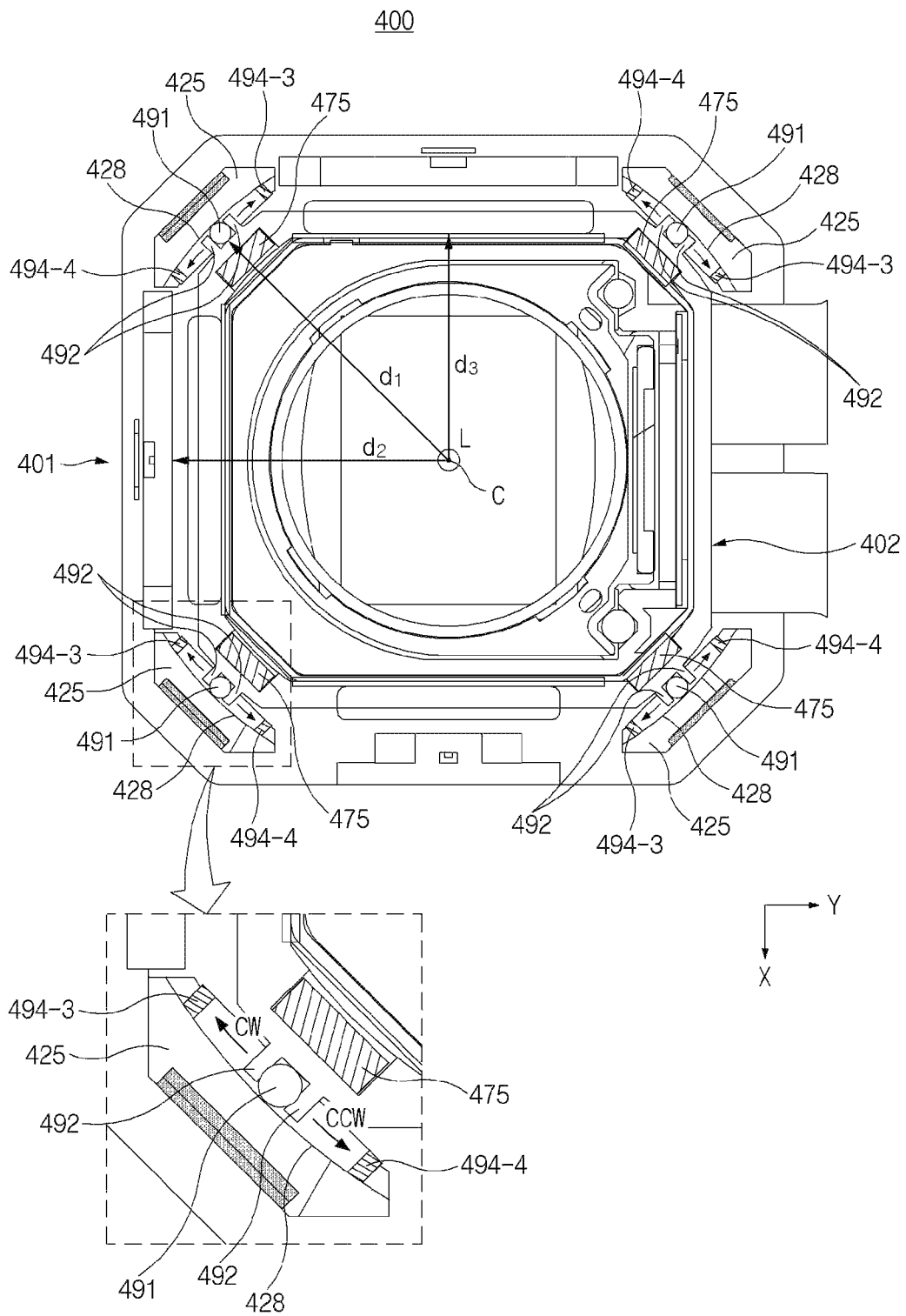
FIG. 15 is a sectional view illustrating a camera module according to an embodiment of the disclosure.

FIG. 15 is a sectional view illustrating a camera module according to an embodiment of the disclosure.

Referring to FIGS. 13, 14, and 15, descriptions of the same components as those described above will be omitted.

Referring to FIG. 13, a camera module 400 may include second support structures 490 formed on corner areas 455 of a moving part 402. In the illustrated embodiment, the second support structures 490 may include protruding portions 492 protruding from surfaces of the corner areas 455, recesses formed in the protruding portions 492, and balls 491 received in the recesses so as to be rotatable. Referring to FIG. 13, the protruding portions 492 may protrude in directions substantially perpendicular to an optical axis L of a lens 461.

Referring to FIG. 14, balls 491 may be disposed such that at least parts thereof are exposed outside protruding portions 492. At least parts of the balls 491 may be received in the recesses. For example, the balls 491 may be disposed such that the volumes of the parts received in the recesses are greater than the volumes of the parts exposed outside the protruding portions 492. Accordingly, when the moving part 402 moves, the balls 491 may roll along inner surfaces of corner sidewalls 425 of a fixed part 401 without being separated from the protruding portions 492.

Referring to FIGS. 14 and 15, second support structures 490 may include fifth magnets 475 disposed on a moving part 402 and yokes 495 disposed on corner sidewalls 425. The balls 491 may be disposed between the fifth magnets 475 and the yokes 495. Attractive forces may act between the fifth magnets 475 and the yokes 495. Accordingly, even when the moving part 402 moves, the balls 491 may make contact with the inner surfaces of the corner sidewalls 425 of the fixed part 401.

Referring to FIGS. 14 and 15, contact areas 428 with which the balls 491 make contact may be formed on the corner sidewalls 425. The contact areas 428 may be defined as areas where the balls 491 roll on the inner surfaces of the corner sidewalls 425 when the moving part 402 moves. The contact areas 428 may be formed of part of a spherical surface. For example, the spherical surface may have, as the center thereof, a center C of rotation that is formed inside the moving part 402 and through which the optical axis L of the lens 461 passes.

Referring to FIGS. 14 and 15, a virtual sphere having the same center may be formed by extension of the contact areas 428 of the corner sidewalls 425. The center of the virtual sphere may be a virtual point at which the optical axis L of the lens 461 intersects with virtual diagonal lines (e.g., the diagonal lines C1, C2, C1', and C2' of FIG. 12) that connect the balls 491 facing each other in diagonal directions and pass through the lens 461. The virtual point may be referred to as the center C of rotation of the moving part 402.

Referring to FIGS. 14 and 15, the corner sidewalls 425 may include protruding walls 494 disposed around the contact areas 428. The protruding walls 494 may be formed to surround at least parts of the contact areas 428. For example, the protruding walls 494 may form spaces in which at least parts of the protruding portions 492 of the second support structures 490 are received. For example, the protruding walls 494 may protrude from the corner sidewalls 425 toward the moving part 402.

Referring to FIG. 14, the protruding walls 494 may function as stoppers that limit the range of rotation of the moving part 402. For example, the protruding portions 492 protruding from the corner areas 455 of the moving part 402 may be located between first portions 494-1 and second portions 494-2 of the protruding walls 494.

Referring to FIG. 14, when the moving part 402 rotates in the clockwise direction, the protruding portion 492 illustrated on the left side may make contact with the first portion 494-1 of the protruding wall 494, and the protruding portion 492 illustrated on the right side may make contact with the second portion 494-2 of the protruding wall 494. Referring to FIG. 14, when the moving part 402 rotates in the counterclockwise direction, the protruding portion 492 illustrated on the left side may make contact with the second portion 494-2 of the protruding wall 494, and the protruding portion 492 illustrated on the right side may make contact with the first portion 494-1 of the protruding wall 494. Accordingly, the range of rotation of the moving part 402 may be limited.

Referring to FIG. 15, the protruding walls 494 may function as stoppers that limit the range of rotation of the moving part 402. For example, the protruding portions 492 protruding from the corner areas 455 of the moving part 402 may be located between third portions 494-3 and fourth portions 494-4 of the protruding walls 494.

Referring to FIG. 15, when the moving part 402 rotates in the clockwise direction, the protruding portions 492 may make contact with third portions 494-3 of the protruding walls 494. When the moving part 402 rotates in the counterclockwise direction, the protruding portions 492 may make contact with fourth portions 494-4 of the protruding walls 494. Accordingly, the range of rotation of the moving part 402 may be limited.

In various embodiments, the first portions 494-1, the second portions 494-2, the third portions 494-3, and the fourth portions 494-4 of the protruding walls 494 may be connected together to surround the contact areas 428 with which the balls 491 make contact.

Referring to FIG. 15, when viewed with respect to the optical axis L of the lens 461, the balls 491 may be located at a first distance d1 from the optical axis L of the lens 461. When viewed with respect to the optical axis L of the lens 461, coils (e.g., a first coil 431, a second coil 432, and a third coil 433) may be located at a second distance d2 from the optical axis L of the lens 461, the second distance d2 being smaller than the first distance d1. When viewed with respect to the optical axis L of the lens 461, magnets (e.g., a first magnet 471, a second magnet 472, and a third magnet 473) may be located at a third distance d3 from the optical axis L of the lens 461, the third distance d3 being smaller than the first distance d1.

In the illustrated embodiment, side surfaces of the moving part 402 may include side areas (e.g., the side areas 451, 452, 453, and 454 of FIG. 6) that have a relatively large area and the corner areas 455 that are formed between the side areas and that have a relatively small area. The moving part 402 of the camera module 400 according to the illustrated embodiment may be configured such that the magnets 471, 472, and 473 are disposed on the side areas having a relatively large area and the balls 491 are rotatably coupled to the corner areas 455 having a relatively small area. Accordingly, the magnets 471, 472, and 473 and the coils 431, 432, and 433 having sizes sufficient to drive the moving part 402 may be provided in the camera module 400. Meanwhile, although the balls 491 are disposed between the corner areas 455 having a relatively small area and the corner sidewalls 425, the balls 491 may provide rolling frictional forces between the moving part 402 and the fixed part 401.

Figure 16:
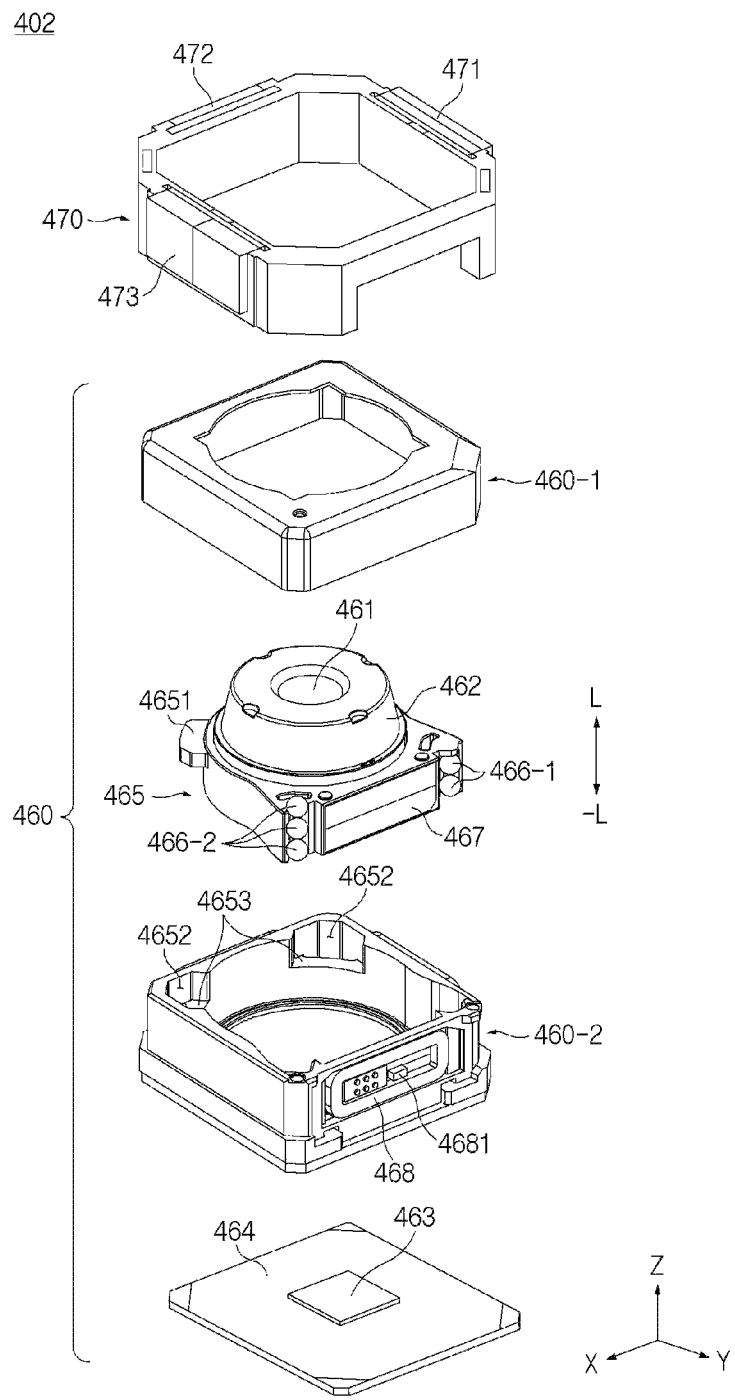
FIG. 16 is an exploded perspective view of a moving part of a camera module according to an embodiment of the disclosure.

FIG. 16 is an exploded perspective view of a moving part of the camera module according to an embodiment of the disclosure.

The moving part 402 illustrated in FIG. 16 may include the moving part 402 illustrated in FIGS. 6 and 13.

Referring to FIG. 16, a moving part 402 may include a camera assembly 460, a second camera housing 460-1 and 460-2, a lens carrier 465, a holder 470, and a circuit board 464. At least one of components of the camera assembly 460 according to an embodiment is the same as, or similar to, at least one of the components of the camera module 400 of FIGS. 5A and 5B. Therefore, repetitive description will hereinafter be omitted.

In an embodiment, the holder 470 may be disposed to surround the second camera housing 460-1 and 460-2. The magnets 471, 472, and 472 may be disposed on the holder 470.

In an embodiment, the second camera housing 460-1 and 460-2 may form an inner space in which the lens carrier 465 is received. For example, the second camera housing 460-1 and 460-2 may include the upper housing 460-1 and the lower housing 460-2. In an embodiment, the upper housing 460-1 may have an opening formed in an upper surface thereof. In an embodiment, the circuit board 464 and an image sensor 463 may be disposed inside the lower housing 460-2.

In an embodiment, the image sensor 463 may be seated on the circuit board 464, and the circuit board 464 may be fixed to the lower housing 460-2. For example, when the lens carrier 465 moves in the direction of the optical axis L, the distance between the image sensor 463 fixed to the second camera housing 460-1 and 460-2 and the lens 461 may vary.

In an embodiment, the lens carrier 465 may include a lens barrel 462. The lens barrel 462 may contain at least one lens 461. The lens barrel 462 may be formed to surround the lens 461. In various embodiments, the lens 461 and the lens barrel 462 may be referred to as a lens assembly (e.g., the lens assembly 210 of FIG. 2). In an embodiment, the lens carrier 465 may be moved (e.g., L/–L directions) in a space between the upper housing 460-1 and the lower housing 460-2 with respect to the optical axis L of the lens 461. The camera module 400 may perform an auto focus function by moving (e.g., the L/−L directions) the lens 461 together with the lens carrier 465 with respect to the direction of the optical axis L.

In an embodiment, the camera assembly 460 may include a fourth magnet 467 and a fourth coil 468 for moving (e.g., the L/−L directions) the lens carrier 465 with respect to the optical axis L of the lens 461. For example, the fourth magnet 467 may be disposed on a side surface of the lens carrier 465, and the fourth coil 468 may be disposed on the upper housing 460-1 or the lower housing 460-2 to substantially face the fourth magnet 467. The fourth magnet 467 and the fourth coil 468 may electromagnetically interact with each other under the control of control circuitry (e.g., the processor 120 of FIG. 1 and/or the image signal processor 260 of FIG. 2). For example, under the control of a processor (e.g., the processor 120 of FIG. 1 and/or the image signal processor 260 of FIG. 2), the camera module 400 may control an electromagnetic force by controlling the direction and/or strength of a current flowing through the fourth coil 468 and may move (e.g., the L/−L directions) the lens carrier 465 with respect to the optical axis L by using the Lorentz force generated by the electromagnetic force.

In an embodiment, the camera assembly 460 may further include a sensor 4681 configured to sense the position of the fourth magnet 467. For example, the sensor 4681 may be disposed on the upper housing 460-1 or the lower housing 460-2. In an embodiment, the sensor 4681 may detect the displacement of the lens carrier 465 through the position of the fourth magnet 467 moving together with the lens carrier 465. For example, the sensor 4681 may sense the position of the fourth magnet 467 by measuring a change of a magnetic field formed by the fourth magnet 467. For example, the camera module 400 may measure the position of the lens carrier 465, based on a signal sensed by the sensor 4681. In various embodiments, the sensor 4681 may include a Hall sensor.

In an embodiment, the sensor 4681 may detect the displacement of the lens carrier 465 and/or the fourth magnet 467, and control circuitry (e.g., the first processor 120 of FIG. 1 and/or the image signal processor 260 of FIG. 2) of an electronic device (e.g., the electronic device 101 of FIG. 1 or the electronic device 300 of FIGS. 3A to 3C) may provide an auto focus function using the fourth magnet 467 and the fourth coil 468. For example, the distance between the lens 461 and the image sensor 463 disposed on the second camera housing 460-1 and 460-2 (e.g., the lower housing 460-2) may be varied as the lens 461, together with the lens carrier 465, is moved (e.g., the L/−L directions) with respect to the direction of the optical axis L. As described above, the electronic device may move the lens carrier 465 depending on the distance from a subject, thereby adjusting a focal distance.

In an embodiment, the camera assembly 460 may include a plurality of balls 466-1 and 466-2 disposed between a side surface of the lens carrier 465 and the second camera housing 460-1 and 460-2. In an embodiment, the plurality of balls 466-1 and 466-2 may provide rolling frictional forces between the lens carrier 465 and part (e.g., the lower housing 460-2) of the second camera housing when the lens carrier 465 is moved in the direction of the optical axis L. In the illustrated embodiment, the plurality of balls 466-1 and 466-2 may include the first plurality of balls 466-1 disposed on one side of the fourth magnet 467 and the second plurality of balls 466-2 disposed on an opposite side of the fourth magnet 467. For example, the first plurality of balls 466-1 and the second plurality of balls 466-2 may be arranged in the direction of the optical axis L of the lens 461.

In an embodiment, the first plurality of balls 466-1 may be configured to include a smaller number of balls than the second plurality of balls 466-2. For example, due to a structure (e.g., an inclined edge shape or a chamfer area) of the camera module 400 (e.g., the camera module 400 of FIG. 4), the first plurality of balls 466-1 disposed on the one side (e.g., the right side) of the fourth magnet 467 may include a smaller number balls than the second plurality of balls 466-2 disposed on the opposite side (e.g., the left side) of the fourth magnet 467.

In an embodiment, to guide a movement of the lens carrier 465 in the direction of the optical axis L, the camera assembly 460 may include a guide member 4651 and a guide rail 4652 in which the guide member 4651 is received. The guide member 4651 may protrude from a side surface of the lens carrier 465, and the guide rail 4652 may be formed on the upper housing 460-1 or the lower housing 460-2 and may have the guide member 4651 received therein. For example, the guide rail 4652 may be formed on at least part of the lower housing 460-2. The guide member 4651 may be received in the guide rail 4652 and may guide a movement (e.g., the L/−L directions) of the lens carrier 465 with respect to the optical axis L.

In an embodiment, the guide rail 4652 may extend from a step surface 4653 formed on the lower housing 460-2 and may be open in an upper direction (e.g., the Z-axis direction). When the lens carrier 465 moves in a lower direction (e.g., the −Z-axis direction), the step surface 4653 may support the guide member 4651 to limit a movement range of the lens carrier 465 in the lower direction (e.g., the −L direction).

Figure 17A:
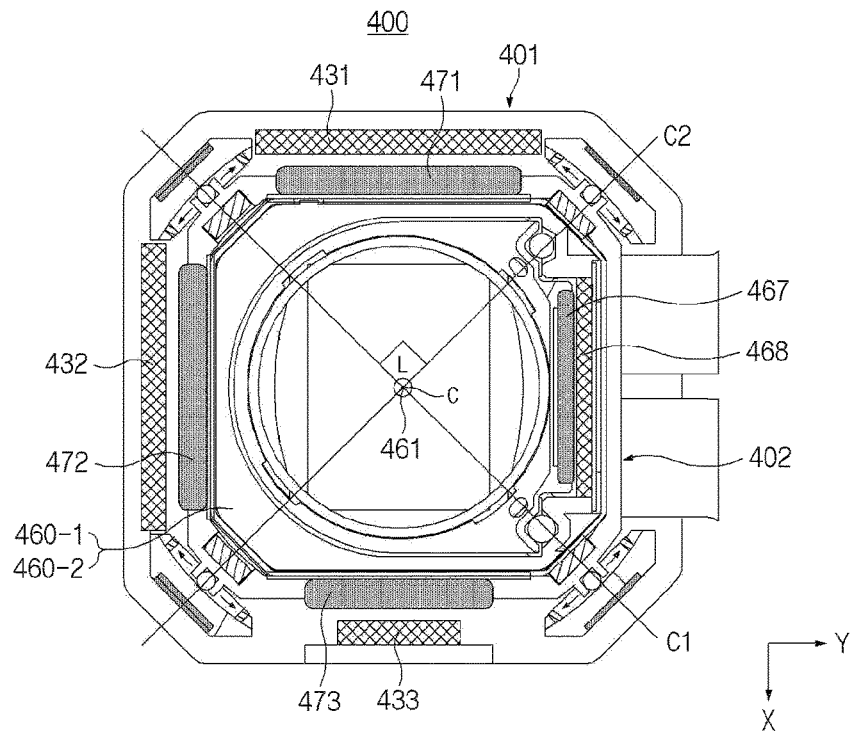
FIGS. 17A and 17B are views illustrating arrangement of magnets and coils of a camera module according to various embodiments of the disclosure.
Figure 17B:
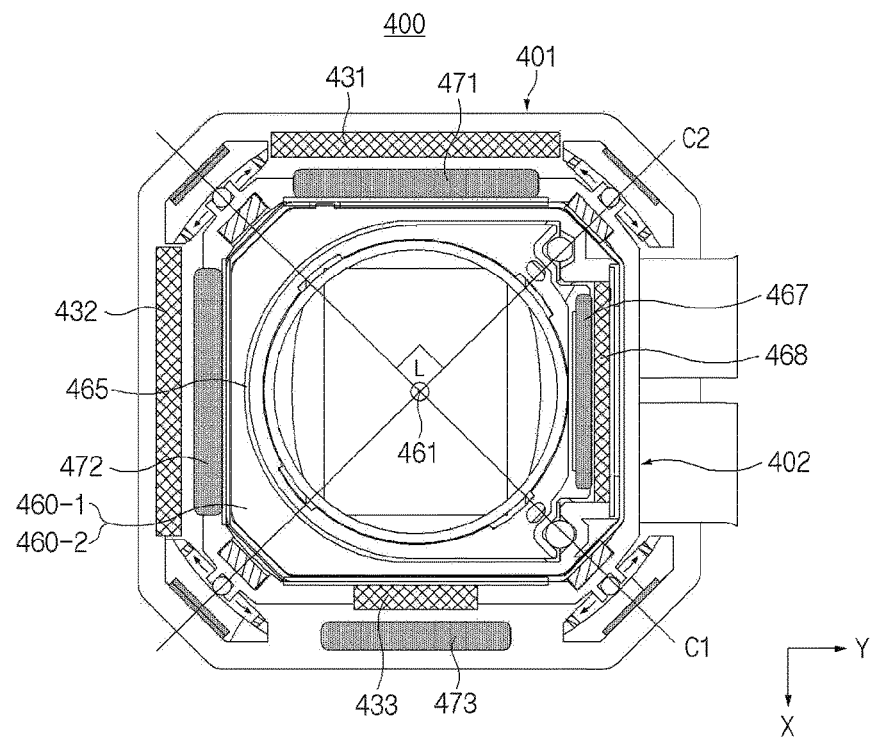

FIGS. 17A and 17B are views illustrating an arrangement structure of coils and magnets of a camera module according to various embodiments of the disclosure.

In an embodiment, the camera module 400 may perform an image stabilization function and an auto focus function.

In an embodiment, the camera module 400 may include the coils (the first coil 431, the second coil 432, and the third coil 433) and the magnets (the first magnet 471, the second magnet 472, and the third magnet 473) related to the image stabilization function. The coils 431, 432, and 433 and the magnets 471, 472, and 473 may be configured to electromagnetically interact with each other. The coils 431, 432, and 433 and the magnets 471, 472, and 473 electromagnetically interacting with each other may be disposed to face each other. For example, the first coil 431 may be configured to interact with the first magnet 471. The first magnet 471 and the first coil 431 may be disposed to face each other. For example, the second coil 432 may be configured to interact with the second magnet 472. The second magnet 472 and the second coil 432 may be disposed to face each other. For example, the third coil 433 may be configured to interact with the third magnet 473. The third magnet 473 and the third coil 433 may be disposed to face each other.

In an embodiment, the first coil 431 and the second coil 432 may interact with the first magnet 471 and the second magnet 472, respectively, and the moving part 402 may rotate about two axes of rotation (e.g., C1 and C2, or X-axis and Y-axis) that are defined on an x-y plane and perpendicular to each other. In an embodiment, the third coil 433 may interact with the third magnet 473, and the moving part 402 may rotate about an axis of rotation parallel to the optical axis L of the lens 461.

Referring to FIG. 17A, a first magnet 471, a second magnet 472, and a third magnet 473 may be disposed on a moving part 402, and a first coil 431, a second coil 432, and a third coil 433 may be disposed on the fixed part 401.

Referring to FIG. 17B, a first magnet 471 and a second magnet 472 may be disposed on a moving part 402, and a third magnet 473 may be disposed on a fixed part 401. The first coil 431 and the second coil 432 may be disposed on the fixed part 401, and the third coil 433 may be disposed on the moving part 402.

In an embodiment, arrangements of the coils 431, 432, and 433 and the magnets 471, 472, and 473 are not limited to those illustrated in the drawing, and the coils 431, 432, and 433 and the magnets 471, 472, and 473 may be disposed in various structures. In an embodiment, one of the first coil 431 or the first magnet 471 may be disposed on the moving part 402, and the other may be disposed on the fixed part 401. In an embodiment, one of the second coil 432 or the second magnet 472 may be disposed on the moving part 402, and the other may be disposed on the fixed part 401. In an embodiment, one of the third coil 433 or the third magnet 473 may be disposed on the moving part 402, and the other may be disposed on the fixed part 401.

In an embodiment, the camera module 400 may include the fourth coil 468 and the fourth magnet 467 related to the auto focus function. For example, the fourth coil 468 may be configured to interact with the fourth magnet 467. The fourth magnet 467 and the fourth coil 468 may be disposed to face each other. In an embodiment, the fourth coil 468 may interact with the fourth magnet 467, and the lens carrier 465 may linearly move in the direction of the optical axis L of the lens 461.

In an embodiment, arrangement of the fourth coil 468 and the fourth magnet 467 is not limited to that illustrated in the drawing, and the fourth coil 468 and the fourth magnet 467 may be disposed in various structures. In an embodiment, one of the fourth coil 468 or the fourth magnet 467 may be disposed on the lens carrier 465, and the other may be disposed on the second camera housing 460-1 and 460-2.

Figure 18A:
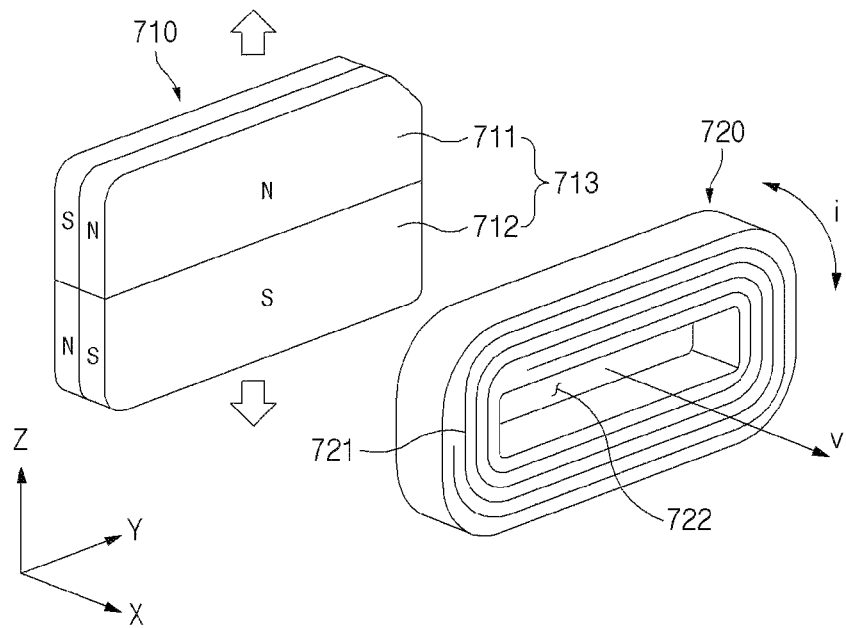
FIGS. 18A and 18B are views illustrating relative movements between coils and magnets of a camera module according to various embodiments of the disclosure.
Figure 18B:
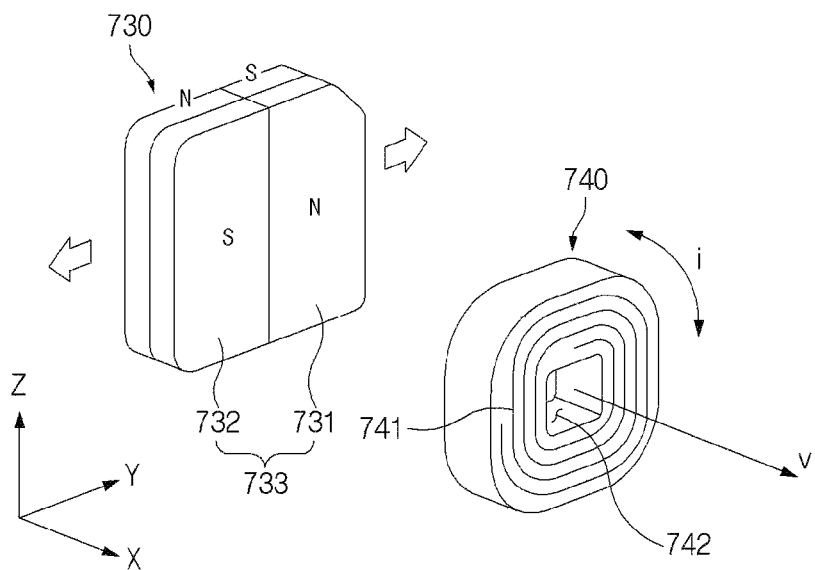

FIGS. 18A and 18B are views illustrating relative movements between coils and magnets of a camera module according to various embodiments of the disclosure.

The magnets 710 and 730 illustrated in FIGS. 18A and 18B may include the first magnet 471, the second magnet 472, the third magnet 473, and/or the fourth magnet 467 illustrated in FIGS. 4, 5A, 5B, 6, 7A, 7B, 8A, 8B, 8C, 9, 10A, 10B, 11A, 11B, 12-16, 17A, and 17B. Furthermore, the coils 720 and 740 illustrated in FIGS. 18A and 18B may include the first coil 431, the second coil 432, the third coil 433, and/or the fourth coil 468 illustrated in FIGS. 4, 5A, 5B, 6, 7A, 7B, 8A, 8B, 8C, 9, 10A, 10B, 11A, 11B, 12-16, 17A, and 17B. In an embodiment, the magnets 471, 472, 473, and 467 and the coils 431, 432, 433, and 468 may electromagnetically interact with each other when a current "i" is applied to the coils 431, 432, 433, and 468. The coils 431, 432, 433, and 468 may be disposed in positions where the coils 431, 432, 433, and 468 are able to interact with magnetic fields formed by the magnets 471, 472, 473, and 467.

In an embodiment, the magnet 710 and the coil 720 illustrated in FIG. 18A may move a lens (e.g., the lens carrier 465 of FIG. 16) in a direction parallel to an optical axis (e.g., the optical axis L of FIG. 16) in relation to an auto focus function. In an embodiment, in relation to an image stabilization function, the magnet 710 and the coil 720 illustrated in FIG. 18A may move a camera assembly (e.g., the moving part 402 of FIG. 6) with respect to an axis of rotation perpendicular to the optical axis L (e.g., an axis substantially parallel to the first diagonal line C1 of FIG. 9 and/or an axis substantially parallel to the second diagonal line C2 of FIG. 9).

In an embodiment, the magnet 730 and the coil 740 illustrated in FIG. 18B may rotate (e.g., FIG. 12) the camera assembly (e.g., the moving part 402 of FIG. 6) about the optical axis L of the lens in relation to the image stabilization function.

In various embodiments, one of the magnets 710 and 730 or the coils 720 and 740 may be disposed on a fixed structure (e.g., the fixed part 401 of FIGS. 5A and 5B or the second camera housing 460-1 and 460-2 of FIG. 16), and the other may be disposed on a moving structure (e.g., the moving part 402 of FIGS. 5A and 5B or the lens carrier 465 of FIG. 16) that moves relative to the fixed structure.

For example, in the embodiment illustrated in FIG. 18A, when a lens carrier (e.g., the lens carrier 465 of FIG. 16) linearly moves for the auto focus function, the coil 720 may be disposed on a second camera housing (e.g., the second camera housing 460-1 and 460-2 of FIG. 16) that is a fixed structure, and the magnet 710 may be disposed on the relatively movable lens carrier 465. However, without being necessarily limited thereto, the positions of the coil 720 and the magnet 710 may be changed with each other.

For example, in the embodiment illustrated in FIG. 18A or 18B, when a moving part (e.g., the moving part 402 of FIG. 6) rotates for the image stabilization function, the coils 720 and 740 may be disposed on a camera housing (e.g., the camera housing 410 of FIG. 6) that is a fixed structure, and the magnets 710 and 730 may be disposed on the moving part 402 that is rotatable relative to the camera housing 410. However, without being necessarily limited thereto, the positions of the coils 720 and 740 and the magnets 710 and 730 may be changed with each other.

In an embodiment, the magnets 710 and 730 and the coils 720 and 740 may electromagnetically interact with each other when the current "i" is applied to the coils 720 and 740. For example, the coils 720 and 740 may be disposed in positions where the coils 720 and 740 are able to interact with magnetic fields formed by the magnets 710 and 730. For example, the current "i" applied to the coils 720 and 740 may be adjusted under the control of control circuitry (e.g., the processor 120 of FIG. 1).

In an embodiment, the coils 720 and 740 may be formed in a form in which conductive wires 721 and 741 are wound a plurality of times. For example, vectors "v" that substantially extend in the X-axis direction from opposite surfaces 713 and 733 of the magnets 710 and 730 and pass through areas 722 and 742 surrounded by the conductive wires 721 and 741 may be defined. For example, the coils 720 and 740 may be formed such that the conductive wires 721 and 741 are wound around the vectors "v" a plurality of times. The current "i" may flow through the coils 720 and 740 in the clockwise or counterclockwise direction with respect to the vectors "v".

Referring to FIG. 18A, a magnet 710 may include a plurality of sub-magnets. For example, the magnet 710 may include two sub-magnets. In an embodiment, the magnet 710 may include the opposite surface 713 facing the coil 720. In various embodiments, the magnet 710 may be disposed such that the opposite surface 713 has at least two polarities. For example, a portion 711 of the opposite surface 713 may be formed to be an N pole, and another portion 712 of the opposite surface 713 may be formed to be an S pole. In an embodiment, the N pole and the S pole may be disposed in a direction substantially parallel to a direction in which the N pole and the S pole are to move.

In an embodiment, the current "i" may flow through the coil 720 in the clockwise or counterclockwise direction. The direction of a magnetic force applied to the coil 720 may be determined depending on the direction of the current "i" flowing through the coil 720.

For example, the current "i" may be applied to the coil 720 in the clockwise direction, and a magnetic force (e.g., Lorentz force) facing a lower direction (e.g., the −Z-axis direction) may be applied to the coil 720. At this time, in a case where the coil 720 is disposed on a fixed structure, it may be understood that a force facing an upper direction (e.g., the Z-axis direction) is applied to the magnet 710. Furthermore, for example, the current "i" may be applied to the coil 720 in the counterclockwise direction, and a magnetic force (e.g., Lorentz force) facing the upper direction (e.g., the Z-axis direction) may be applied to the coil 720. At this time, in a case where the coil 720 is disposed on a fixed structure, it may be understood that a force facing the lower direction (e.g., the −Z-axis direction) is applied to the magnet 710. Accordingly, the magnet 710 may move in the upper or lower direction (e.g., the Z/−Z-axis direction) relative to the coil 720 disposed on the fixed structure.

Referring to FIG. 18B, a magnet 730 may include a plurality of sub-magnets. For example, the magnet 730 may include two sub-magnets. In an embodiment, the magnet 730 may include the opposite surface 733 facing the coil 740. In various embodiments, the magnet 730 may be disposed such that the opposite surface 733 has at least two polarities. For example, a portion 731 of the opposite surface 733 may be formed to be an N pole, and another portion 732 of the opposite surface 733 may be formed to be an S pole. In an embodiment, the N pole and the S pole may be disposed in a direction substantially parallel to a direction in which the N pole and the S pole are to move.

In an embodiment, the current "i" may flow through the coil 740 in the clockwise or counterclockwise direction. The direction of a magnetic force applied to the coil 740 may be determined depending on the direction of the current "i" flowing through the coil 740.

For example, the current "i" may be applied to the coil 740 in the clockwise direction, and a magnetic force (e.g., Lorentz force) facing a left direction (e.g., the −Y-axis direction) with respect to the drawing may be applied to the coil 740. At this time, in a case where the coil 740 is disposed on a fixed structure, it may be understood that a force facing a right direction (e.g., the Y-axis direction) with respect to the drawing is applied to the magnet 730. Furthermore, for example, the current "i" may be applied to the coil 740 in the counterclockwise direction, and a magnetic force (e.g., Lorentz force) facing the right direction (e.g., the Y-axis direction) with respect to the drawing may be applied to the coil 740. At this time, in a case where the coil 740 is disposed on a fixed structure, it may be understood that a force facing the left direction (e.g., the −Y-axis direction) with respect to the drawing is applied to the magnet 730. Accordingly, the magnet 730 may move in the left or right direction (e.g., the Y/−Y-axis direction) relative to the coil 740 disposed on the fixed structure.

According to various embodiments (not illustrated), magnets and coils disclosed herein are not limited to the forms illustrated in FIGS. 18A and 18B. For example, an opposite surface of a magnet may have one polarity. According to various embodiments, a camera module (e.g., the camera module 400 of FIG. 4) of an electronic device (e.g., the electronic device 300 of FIGS. 3A to 3C) may generate a solenoid force using a magnet having one polarity and a coil facing the magnet and may perform rotary motion (e.g., movement) of the camera module 400. For example, the camera module 400 may include a magnetic member (e.g., a solenoid) formed of a wound coil (e.g., a cylindrical coil) and may move a moving part (e.g., the moving part 402 of FIG. 6) using magnetism (N and S poles) formed by allowing a current to flow through the coil.

According to various embodiments, an attractive force or a repulsive force may act between an opposite surface of a magnet that has one polarity and a coil facing the opposite surface. For example, a force may act on the magnet in a direction toward the coil or in a direction away from the coil. For example, in a case where the opposite surface of the magnet has an N pole, an attractive force may be formed between the magnet and the coil when a current is applied to the coil in the clockwise direction. For example, in a case where the opposite surface of the magnet has an N pole, a repulsive force may be formed between the magnet and the coil when a current is applied to the coil in the counterclockwise direction.

Figure 19A:
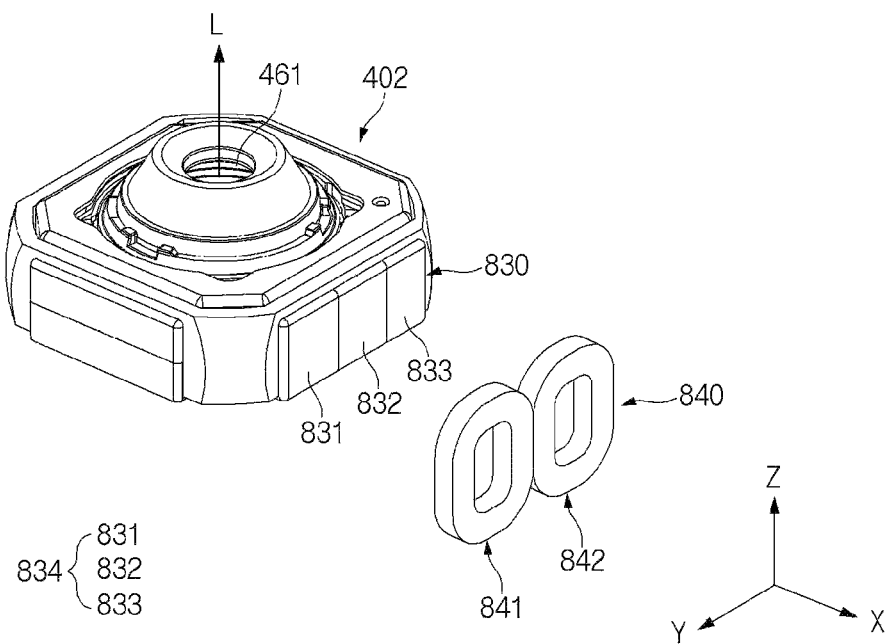
FIGS. 19A and 19B are views illustrating coils and magnets of a camera module according to various embodiments of the disclosure.
Figure 19B:
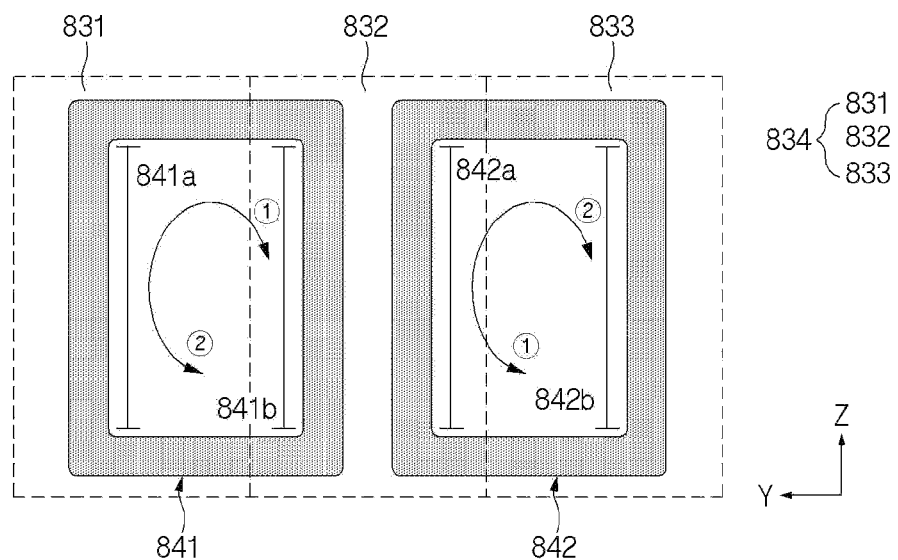

FIGS. 19A and 19B are views illustrating coils and magnets of a camera module according to various embodiments of the disclosure.

Referring to FIGS. 19A and 19B, a moving part 402 may be configured to rotate about an axis of rotation parallel to an optical axis L of a lens 461. The moving part 402 may include a magnet 830, and a fixed part (e.g., the fixed part 401 of FIGS. 17A and 17B) may include a coil 840 facing the magnet 830.

The magnet 830 and the coil 840, which are related to a movement (e.g., yawing motion) of the moving part 402 that rotates about the axis of rotation parallel to the optical axis L of the lens 461, may operate in the same driving scheme as the magnet 730 and the coil 740 illustrated in FIG. 18B.

In an embodiment, an opposite surface 834 of the magnet 830 that faces the coil 840 may have three polarities. For example, the opposite surface 834 may include a first area 831 having a first polarity, a second area 832 having a second polarity, and a third area 833 having the first polarity.

In an embodiment, the coil 840 may include a first coil 841 and a second coil 842. Referring to FIG. 19B, when viewed in the X-axis direction, one portion of the first coil 841 may overlap the first area 831, and the other portion of the first coil 841 may overlap the second area 832. When viewed in the X-axis direction, one portion of the second coil 842 may overlap the second area 832, and the other portion of the second coil 842 may overlap the third area 833.

In an embodiment, portions including conductive wires extending in the Z-axis direction may be defined in each of the first coil 841 and the second coil 842. The first coil 841 may include a first portion 841*a* and a second portion 841*b*. The second coil 842 may include a third portion 842*a* and a fourth portion 842*b*. The first portion 841*a*, the second portion 841*b*, the third portion 842*a*, and the fourth portion 842*b* may be substantially related to the magnitude of an electromagnetic force between the magnet 830 and the coil 840. For example, an electromagnetic force applied to the magnet 830 may be increased as the current flowing through the first portion 841*a*, the second portion 841*b*, the third portion 842*a*, and the fourth portion 842*b* is increased.

In an embodiment, the first portion 841*a* of the first coil 841 may overlap the first area 831 of the magnet 830, and the second portion 841*b* of the first coil 841 may overlap the second area 832 of the magnet 830. The third portion 842*a* of the second coil 842 may overlap the second area 832 of the magnet 830, and the fourth portion 842*b* of the second coil 842 may overlap the third area 833 of the magnet 830.

In an embodiment, an electromagnetic force formed by the first coil 841 and the magnet 830 and an electromagnetic force formed by the second coil 842 and the magnet 830 may preferably act in the same direction. To achieve this, currents may flow in the same direction through the second portion 841b and the third portion 842a that overlap the second area 832. In an embodiment, control circuitry (e.g., the processor 120 of FIG. 1) may perform control such that currents flow through the first coil 841 and the second coil 842 in opposite directions. In this case, an electromagnetic force may be applied to the magnet 830 and the moving part 402 in the Y-axis direction.

The camera module 400 included in an electronic device (e.g., the electronic device 300 of FIGS. 3A to 3C) may have a limitation in the height in the Z-axis direction for the purpose of a small thickness of the electronic device 300. For example, as required performance of the camera module 400 is increased, the size of the lens 461 may be increased, and the size of the moving part 402 may be increased. To drive the moving part 402 having an increased size, the coil 840 and the magnet 830 having increased sizes may be required. For example, the limitation in the height in the Z-axis direction may be related to yawing motion of the moving part 402.

Rolling motion and pitching motion of the moving part 402 may be relatively free from the height in the Z-axis direction. For example, referring to the coil 720 and the magnet 710 illustrated in FIG. 18A, Y-axis extensions including conductive wires extending in the Y-axis direction may be defined in the coil 720. The Y-axis extensions may be related to the magnitude of an electromagnetic force. An increase in the height in the Z-axis direction may be restrictive even though the number of times that the conductive wire of the coil 720 is wound is increased to increase a current flowing through the Y-axis extensions.

Accordingly, in relation to yawing motion of the moving part 402, the camera module 400 illustrated in FIGS. 19A and 19B may include the two coils 841 and 842 and the magnet 830 including the opposite surface 834 having the three polarities, thereby increasing a driving force (e.g., an electromagnetic force) without an increase in the height in the Z-axis direction.

An electronic device 101 according to embodiments of the disclosure may include a housing 310 and a camera module 400, at least part of which is disposed inside the housing 310. The camera module 400 may include a fixed part 401 including a camera housing 410 fixedly disposed in the electronic device 101, a moving part 402 including a lens 461 and an image sensor 463, at least part of the moving part 402 being received inside the camera housing 410 such that the moving part 402 moves relative to the fixed part 401, a drive member that moves the moving part 402 and that includes a first drive member disposed on the camera housing 410 and a second drive member that is disposed on the moving part 402 and that electromagnetically interacts with the first drive member, and a support structure 480, 490 that supports a movement of the moving part 402 and that includes a ball 481 coupled to one of the moving part or the camera housing 410 so as to be rotatable and disposed to make contact with the other. The moving part 402 may be configured such that a first distance d1 from an optical axis of the lens 461 to the ball is greater than a second distance d2 from the optical axis of the lens 461 to the second drive member (e.g., one of a magnet 471, 472, 473 or a coil 431, 432, 433).

In various embodiments, the first drive member may include one of a magnet 471, 472, 473 or a coil 431, 432, 433, and the second drive member may include the other that faces the one of the magnet or the coil.

In various embodiments, the support structure 480, 490 may include a recess in which at least part of the ball 481 is received so as to be rotatable.

In various embodiments, the ball 481 may be configured to roll along an inner surface of the camera housing 410 and rotate inside the recess, when the moving part 402 moves.

In various embodiments, the ball 481 may be configured to roll along a surface of the moving part 402 when the moving part 402 moves.

In various embodiments, an area of the moving part 402 or the camera housing 410 with which the ball makes contact may be formed of a spherical surface.

In various embodiments, the support structure 480, 490 may include a fifth magnet 475 disposed on one of the moving part 402 or the camera housing 410 and a yoke 485, 495 that is disposed on the other and that forms an attractive force with the fifth magnet 475, and the ball 481 may be disposed between the magnet and the yoke.

In various embodiments, the ball 481 may include a plurality of balls.

In various embodiments, the first drive member may include a first coil 431 and a second coil 432, and the second drive member may include a first magnet 471 that faces the first coil 431 and a second magnet 472 that faces the second coil 432.

In various embodiments, the camera housing 410 may include a first sidewall 421 on which the first coil 431 is disposed, a second sidewall 422 on which the second coil 432 is disposed, and a corner sidewall 425 formed between the first sidewall 421 and the second sidewall 422. The moving part 402 may include a first side area 451 on which the first magnet 471 is disposed, a second side area 452 on which the second magnet 472 is disposed, and a corner area 455 formed between the first side area 451 and the second side area 452. The ball 481 may be disposed between the corner area 455 and the corner sidewall 425. At least one of the corner area 455 or the corner sidewall 425 may include a spherical surface at least partially making contact with the ball 481.

In various embodiments, the ball 481 may be coupled to the corner sidewall 425 so as to be rotatable and may roll along a partial area of the corner area 455.

In various embodiments, the corner sidewall 425 may include a first corner sidewall 425-1 and a second corner sidewall 425-2 that face each other with the lens 461 therebetween, a virtual diagonal line C1 connecting the first corner sidewall 425-1 and the second corner sidewall 425-2 may be defined, and the center of the spherical surface may substantially match a point at which the virtual diagonal line C1 and the optical axis L of the lens 461 intersect each other.

In various embodiments, a contact area (e.g., inside surface 426) of the first corner sidewall 425-1 and a contact area (e.g., inside surface 426) of the second corner sidewall 425-2 may be formed of spherical surfaces having substantially the same curvature.

An electronic device 101 according to embodiments of the disclosure may include a housing 310 and a camera module 400, at least part of which is disposed inside the housing 310. The camera module may include a fixed part 401 including a base 411 and a sidewall structure 420 disposed on the base 411, a moving part 402 that is disposed to be at least partially surrounded by the sidewall structure 420 and that includes a lens 461, an image sensor 463, and a circuit board that is electrically connected with the image sensor 463 or on which the image sensor 463 is disposed, the circuit board being disposed to at least partially face the base 411, a plurality of coils including a first coil 431 disposed on a first sidewall 421 of the sidewall structure 420, a second coil 432 disposed on a second sidewall 422 of the sidewall structure 420, and a third coil 433 disposed on a third sidewall 423 of the sidewall structure 420, and one or more balls 481 disposed between the moving part 402 and the sidewall structure 420. The electronic device may further include control circuitry (e.g., the processor 120) electrically connected with the plurality of coils, and the control circuitry may be configured to perform an image stabilization function by moving the moving part 402 using at least one of the plurality of coils to vary a gap between the circuit board and the base 411.

In various embodiments, the balls 481 may be located at a first distance d1 from an optical axis L of the lens 461 in directions perpendicular to the optical axis L of the lens 461, and the plurality of coils may be located at a second distance d2 from the optical axis L of the lens 461 in directions perpendicular to the optical axis L of the lens 461, the second distance d2 being smaller than the first distance d1.

In various embodiments, the balls 481 may be coupled to one of the moving part 402 or the sidewall structure 420 so as to be rotatable and may be configured to roll along a first area of a surface of the other when the moving part 402 moves.

In various embodiments, the first area (e.g., contact areas 456, 428) may be substantially formed of a spherical surface, and the center of the spherical surface may be a point that is located inside the moving part 402 and through which an optical axis L of the lens 461 substantially passes.

In various embodiments, the moving part 402 may include a camera assembly 460 including the lens 461, the image sensor 463, and the circuit board and a holder 470 that surrounds at least part of the camera assembly 460. The holder 470 may include a plurality of magnets including a first magnet 471 that faces the first coil 431, a second magnet 472 that faces the second coil 432, and a third magnet 473 that faces the third coil 433. The plurality of magnets may be located at a third distance d3 from the optical axis L of the lens 461, the third distance d3 being smaller than the first distance d1.

In various embodiments, the camera assembly 460 may further include a lens carrier 465 including the lens 461 and a fourth coil 468 disposed inside the camera assembly 460, and the control circuitry (e.g., the processor 120) may be configured to perform an auto focus function by linearly moving the lens carrier 465 in a direction of the optical axis L of the lens 461 using the fourth coil 468 to change a gap between the lens 461 and the image sensor 463.

A camera module 400 according to embodiments of the disclosure may include a fixed part 401 including a camera housing 410, a moving part 402 including a lens 461 and an image sensor 463, at least part of the moving part 402 being received inside the camera housing 410 such that the moving part 402 moves relative to the fixed part 401, a drive member that moves the moving part 402 and that includes a coil 431, 432, 433 disposed on the camera housing 410 and a magnet 471, 472, 473 that is disposed on the moving part 402 and that electromagnetically interacts with the coil 431, 432, 433, and a support structure 480 that is disposed on a corner sidewall 425 of the fixed part 401 to support a movement of the moving part 402 and that includes a ball 481 coupled to one of the moving part 402 or the camera housing 410 so as to be rotatable and disposed to roll along a surface of the other. A third distance d3 measured from an optical axis L of the lens 461 to the magnet 471, 472, 473 in a direction perpendicular to the optical axis L of the lens 461 may be smaller than a first distance d1 measured from the optical axis L of the lens 461 to the ball 481 in a direction perpendicular to the optical axis L of the lens 461. The support structure 480 may be disposed on a first corner sidewall 425-1 and a second corner sidewall 425-2 that face each other in a direction of a first diagonal line C1 passing through the lens 461 and may be disposed on a third corner sidewall 425-3 and a fourth corner sidewall 425-4 that face each other in a direction of a second diagonal line C2 passing through the lens 461. The moving part 402 may be configured to rotate about axes parallel to the first diagonal line C1, the second diagonal line C2, and the optical axis L of the lens 461.

According to the embodiments of the disclosure, the camera module and the electronic device including the same may provide a rolling frictional force between the moving part including the lens and the image sensor and the fixed part in which the moving part is received. Accordingly, the moving part may be smoothly moved when an image stabilization function is performed.

In addition, the disclosure may provide various effects that are directly or indirectly recognized.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
    a housing; and
    a camera, at least part of which is disposed inside the housing,
    wherein the camera comprises:
        a fixed part comprising a camera housing fixedly disposed in the electronic device,
        a moving part comprising a lens and an image sensor and configured to enable the lens and the image sensor to move together, wherein at least part of the moving part is received inside the camera housing such that the moving part moves relative to the fixed part,
        a drive member configured to move the moving part, the drive member comprising a first drive member disposed on the camera housing and a second drive member disposed on the moving part and configured to electromagnetically interact with the first drive member, and
        a support structure configured to support a movement of the moving part, the support structure comprising a ball coupled to one of the moving part or the camera housing so as to enable the moving part to be tilted and disposed to make contact with the other of the moving part or the camera housing, and
        wherein the moving part is configured such that a first distance from an optical axis of the lens to the ball is greater than a second distance from the optical axis of the lens to the second drive member.

2. The electronic device of claim 1,
    wherein the first drive member comprises one of a magnet or a coil, and
    wherein the second drive member comprises the other of the magnet or the coil configured to face the one of the magnet or the coil.

3. The electronic device of claim 1, wherein the support structure comprises a recess in which at least part of the ball is received so as to be rotatable.

4. The electronic device of claim 3, wherein the ball is configured to roll along an inner surface of the camera housing and rotate inside the recess, when the moving part moves.

5. The electronic device of claim 3, wherein the ball is configured to roll along a surface of the moving part when the moving part moves.

6. The electronic device of claim 1, wherein an area of the moving part or the camera housing with which the ball makes contact is formed of a spherical surface.

7. The electronic device of claim 1,
    wherein the support structure comprises a magnet disposed on one of the moving part or the camera housing and a yoke disposed on the other of the moving part or the camera housing and configured to form an attractive force with the magnet, and
    wherein the ball is disposed between the magnet and the yoke.

8. The electronic device of claim 1, wherein the ball comprises a plurality of balls.

9. The electronic device of claim 1,
    wherein the first drive member comprises a first coil and a second coil, and
    wherein the second drive member comprises a first magnet configured to face the first coil and a second magnet configured to face the second coil.

10. The electronic device of claim 9,
    wherein the camera housing comprises a first sidewall on which the first coil is disposed, a second sidewall on which the second coil is disposed, and a corner sidewall formed between the first sidewall and the second sidewall,
    wherein the moving part comprises a first side area on which the first magnet is disposed, a second side area on which the second magnet is disposed, and a corner area formed between the first side area and the second side area, wherein the ball is disposed between the corner area and the corner sidewall, and wherein at least one of the corner area or the corner sidewall comprises a spherical surface at least partially making contact with the ball.

11. The electronic device of claim 10, wherein the ball is coupled to the corner sidewall so as to be rotatable and rolls along a partial area of the corner area.

12. The electronic device of claim 11, wherein the corner sidewall comprises a first corner sidewall and a second corner sidewall configured to face each other with the lens therebetween, wherein a virtual diagonal line connecting the first corner sidewall and the second corner sidewall is defined, and wherein the center of the spherical surface substantially matches a point at which the virtual diagonal line and the optical axis of the lens intersect each other.

13. The electronic device of claim 12, wherein a contact area of the first corner sidewall and a contact area of the second corner sidewall are formed of spherical surfaces having substantially a same curvature.

14. An electronic device comprising:

a housing; and a camera, at least part of which is disposed inside the housing, wherein the camera comprises:

a fixed part comprising a base and a sidewall structure disposed on the base, a moving part disposed to be at least partially surrounded by the sidewall structure, the moving part comprising a lens, an image sensor, and a circuit board that is electrically connected with the image sensor or on which the image sensor is disposed and configured to enable the lens, the image sensor, and the circuit board to move together, wherein the circuit board is disposed to at least partially face the base, a plurality of coils comprising a first coil disposed on a first sidewall of the sidewall structure, a second coil disposed on a second sidewall of the sidewall structure, and a third coil disposed on a third sidewall of the sidewall structure, and one or more balls disposed between the moving part and the sidewall structure so as to enable the moving part to be tilted, wherein the electronic device further comprises control circuitry electrically connected with the plurality of coils, and wherein the control circuitry is configured to perform an image stabilization function by moving the moving part using at least one of the plurality of coils to vary a gap between the circuit board and the base.

15. The electronic device of claim 14, wherein the balls are located at a first distance from an optical axis of the lens in directions perpendicular to the optical axis of the lens, and wherein the plurality of coils are located at a second distance from the optical axis of the lens in directions perpendicular to the optical axis of the lens, the second distance being smaller than the first distance.

* * * * *